United States Patent [19]

Metcalf

[11] E Re. 29,353

[45] Reissued Aug. 16, 1977

[54] SWITCHING SYSTEM FOR A TRANSPORTATION SYSTEM EMPLOYING A GUIDEWAY

[75] Inventor: John M. Metcalf, Dallas, Tex.

[73] Assignee: Vought Corporation, Dallas, Tex.

[21] Appl. No.: 645,123

[22] Filed: Dec. 29, 1975

Related U.S. Patent Documents

Reissue of:

[64] Patent No.: 3,782,292
Issued: Jan. 1, 1974
Appl. No.: 202,753
Filed: Nov. 29, 1971

[51] Int. Cl.[2] ..... E01B 25/12

[52] U.S. Cl. ..... 104/130; 246/388

[58] Field of Search ..... 104/130, 88, 96, 99, 104/100, 103, 104, 118, 119, 242, 245, 247; 246/382, 385, 388, 389, 390, 415 R, 445

[56] References Cited

U.S. PATENT DOCUMENTS

| | | | |
|---|---|---|---|
| 1,690,448 | 11/1928 | Hornby | 246/388 |
| 3,098,454 | 7/1963 | Maestrelli | 104/130 X |
| 3,310,004 | 3/1967 | Chadenson | 104/130 |
| 3,403,634 | 10/1968 | Crowder | 104/88 X |
| 3,456,596 | 7/1969 | Cooper | 104/100 X |
| 3,650,216 | 3/1972 | Harwick et al. | 104/130 X |
| 3,680,488 | 8/1972 | Donlon | 104/130 |

FOREIGN PATENT DOCUMENTS

| | | | |
|---|---|---|---|
| 1,117,941 | 6/1968 | United Kingdom | 104/88 |

*Primary Examiner*—Robert J. Spar
*Assistant Examiner*—Randolph A. Reese
*Attorney, Agent, or Firm*—J. M. Cate; H. C. Goldwire

[57] ABSTRACT

A switching system for a transportation system of the type employing a guideway and vehicles adapted to travel along the guideway. A guideway junction is provided having a first end communicating with a first portion of the guideway and having a bifurcated, second end communicating with second and third, mutually diverging portions of the guideway. A movable guide rail is positioned adjacent the first end of the junction and pivotable between first and second positions for initially guiding a vehicle in a respective one of two directions upon the vehicle entering the junction from the junction first end. A fixed, guiding [means] *structure* is positioned between the movable guide rail and the second guideway portion and is operable to guide a vehicle through the junction and onto the second guideway portion upon the vehicle being initially guided by the movable guide rail while the movable guide rail is in its first position; and another fixed, guiding [means] *structure* is operable to guide a vehicle through the junction and onto the third guideway portion upon the vehicle being initially guided by the movable guide rail positioned in its second position. In one embodiment of the switching system, the movable guide rail is positioned by *an* actuating [means] *mechanism* operable for moving the guide rail to a selected one of its two positions. In another embodiment adapted particularly to accommodate vehicles entering the junction from the second or third guideway portions, the movable guide rail is normally held in its first position by positioning [means] *apparatus* operable for resiliently urging the movable guide rail to its first position, and is deflected to its second position by vehicles which enter the junction from the third guideway portion.

30 Claims, 20 Drawing Figures

SWITCHING SYSTEM FOR A TRANSPORTATION SYSTEM EMPLOYING A GUIDEWAY

Matter enclosed in heavy brackets [ ] appears in the original patent but forms no part of this reissue specification; matter printed in italics indicates the additions made by reissue.

This invention relates to switching apparatus and, more particularly, to a switching system for a ground transportation system of the type employing a guideway and vehicles adapted to travel along the guideway.

Several ground transportation systems have been developed or proposed in which guideways, generally of approximately U-shaped cross-section, are provided for supporting and guiding various types of vehicles along predetermined routes. The guideway of such a system typically employs left and right, upright guide walls and a generally horizontal road surface, extending at least partially between the guide walls, for supporting the vehicles. Vehicles have been constructed which travel along such guideways upon resilient tires and which include following mechanisms adapted to engage the guide walls for guiding or steering the vehicles within the guideways. Alternatively, the following mechanisms may engage guide rail structures, in which case the guideway may consist only of a roadway and at least one guide rail structure extending along or alongside the roadway. Vehicles of the above type are similar to railway cars in many respects, but can provide advantages, such as improved riding qualities and quieter operation, over conventional railway vehicles. Guideway transportation systems are also suited for use with other types of vehicles, such as those employing ground-effect, air cushion, supporting means. Such ground-effect vehicles have great potential for high-speed ground transportation systems and, when adapted to travel within a guideway, can be safely and precisely maneuvered.

While the construction of guideway transportation systems is analogous to that of conventional railway systems in some respects, in other respects it differs radically therefrom, presenting a number of engineering problems to the designer. One such problem, to which the present invention is addressed, relates to the provision in such systems of practicable and reliable switching apparatus. The roadway, or the area normally extending between parallel guide walls, is required to be substantially clear of obstruction over at least large portions of its width in order that it may serve as a continuous, smooth-surfaced ramp upon which the tires or other supporting means of the vehicle may ride. This requirement varies according to the design of the system, e.g., according to the particular guidance system employed by the vehicles and the configuration of the tires of other supporting means, but in general there are necessarily relatively wide areas of the roadway which must remain substantially unobstructed if the vehicles are to achieve safe, smooth passage. This is in contrast to conventional railway systems, wherein the rails serve both to support and guide the cars, and wherein the area between the rails is not associated with the cars. Switching systems for conventional railways utilize the space between diverging, outer rails in switch junctions for the placement of duel, movable rails which divert the cars to one or the other of two, diverging, railway lines, it being required only that narrow gaps remain between the rails upon which the wheels ride and the other rails to permit passage of the flanges of the wheels. Because of the requirement in guideway systems, that substantial portions of the roadway be clear of obstructions, such movable switching rails cannot be conveniently adapted for use in switches for guideway systems. It can thus be seen that the development of efficient switching apparatus for use in guideway transportation systems requires the solution of engineering problems unique to such guideway systems.

Switching systems of several types have been proposed for guideway systems, but they suffer from a number of disadvantages. One approach has been to provide a relatively massive, movable, blade structure in a junction of two, mutually diverging, guideway [portion] *portions*, the blade structure extending longitudinally along the entire length of the junction and being pivotably mounted in such a manner that a distal end section thereof may be selectively positioned along side one or the other guide walls at the entrance to the junction, i.e., at the end of the junction at which the diverging guideway portions are merged. The blade structure then serves to divert approaching vehicles into a selected one of the mutually diverging guideway portions. The massive blade structures of such switches must be constructed and mounted with sufficient precision to ensure accurate alignment of the blade structure with adjacent portions of the guide walls in both positions of the blade structure, all of which tends to increase the cost of the system because of the difficulty of manufacturing and mounting large, precisely dimensioned structures. The size and weight of such a blade structure also necessitate the use of powerful and fairly complex actuating mechanisms for positioning the blade structure. Moreover, because the distal end of the blade structure sweeps across the entire width of the guideway junction during each change of position, any foreign objects which lie on the roadway in the path of the blade may become entrapped in the operating mechanism, or between the blade structure and an adjacent guide wall, and possibly cause a malfunction of the switch. It is, of course, highly [desirably] *desirable* that switching apparatus be designed so that the possibility of serious malfunction, for any reason, is substantially eliminated.

Another type of switching mechanism which has been used in guideway systems employs guide rails extending alongside the guideway within the junctions for directioning the vehicles, guide rollers suitably being mounted on the vehicles for engaging respective ones of the guide rails. A plurality of such guide rails are movably positioned along the sides of a switching junction in such a manner that mutually parallel rails respectively positioned on opposite sides of the junction can be moved simultaneously from one position to another, remaining in parallel alignment, for directioning passing vehicles along a desired route. In at least one such switching system, at least four, movable, guide rail elements are repositioned during each switching cycle; moreover, certain pairs of mutually adjacent rails must be positioned in mutually abutting, longitudinal alignment while other pairs of the rails must be in parallel alignment. This requirement of precise positioning of a number of movable rail elements is undesirable in that the operating mechanism of the switch is required to be complex and precise, adding to the expense of manufacture and the likelihood of malfunction.

It is, accordingly, a major object of the present invention to provide a new and improved switching system for use in guideway transportation systems.

Another object is to provide a guideway switching system which is of reliable and efficient operation.

Yet another object is to provide such a switching system which eliminates the need for precise alignment of a plurality of movable, guide rail elements.

Another major object is to provide such a switching system which can be actuated by conventional switch actuating mechanisms of proven reliability in general railway use.

A further object is to provide such a switching system in which the danger of jamming or binding of a movable guide rail by foreign objects alongside of the movable guide rail is substantially eliminated.

Still another object is to provide a switching apparatus which provides the above-stated advantages but nevertheless is of simple construction, having only one major, movable part, and which is thus of relatively inexpensive, practicable manufacture.

Other objects and advantages will be apparent from the specification and claims and from the accompanying drawings illustrative of the invention.

Figure 1:
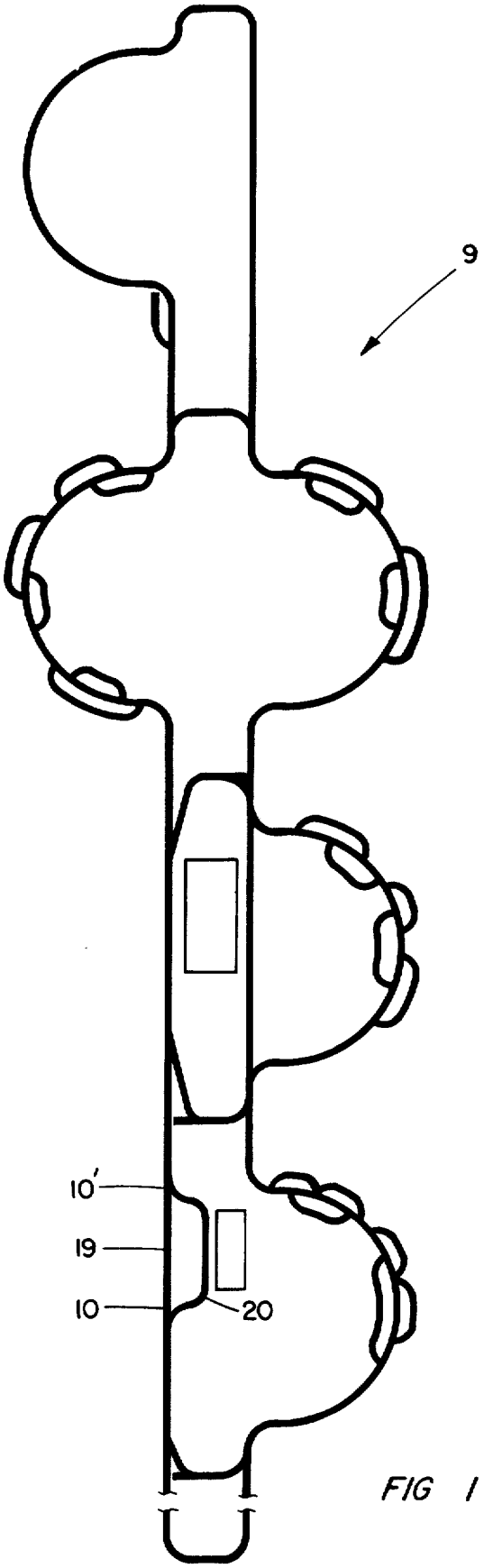
FIG. 1 is a diagrammatic representation of a guideway transportation system employing switching apparatus constructed according to the present invention.

With initial reference to FIG. 1, a typical guideway transportation system employs at least one primary guideway 19, upon which through traffic may pass, and at least one secondary guideway 20 which branches off from the primary guideway by means of a switch 10 and which subsequently rejoins the primary guideway through a second switch 10' (suitably of the passive type to be described in later section) which is reversed in direction. A plurality of the secondary guideways 20 as illustrated, each of which serves as a siding to permit loading and unloading of passengers and/or cargo without interrupting the continuous flow of traffic upon the primary guideway 19, the primary guideway being formed in a closed loop to permit continuous traffic flow thereupon without reversing the direction of vehicles 12 [(FIG. 1)] *(FIG. 2)* to be described. Such a transportation system 9 is suited for use in applications wherein continuous operation is required for transporting a number of passengers to and from a plurality of destinations, as is required in congested areas such as airports, shopping centers, or cities or portions thereof. An exemplary means for controlling the switches 10 in such a guideway system will be discussed in a later section, but it should be noted that vehicles traveling along the main guideway 19 must pass through a great number of the switches 10 which connect with the secondary guideways 20. Thus, each switch system 10 must be reliably and continuously operative if the flow of traffic is to continue, and the malfunction of only one of the switches may cause the entire system 9 to be shut down. In automatically controlled guideway systems in which each vehicle may be independently routed to a respective one of a plurality of destinations, frequent operation of the switches 10 is required to accommodate the continuous flow of traffic, in contrast to a railway system in which there may be fewer destinations and in which the switches need not be individually positioned for each car, but rather are positioned once to accommodate a number of cars grouped into a train, or even a plurality of trains. Reliability of service over extended periods of time is thus of particular importance in such guideway switches 10.

Figure 2:
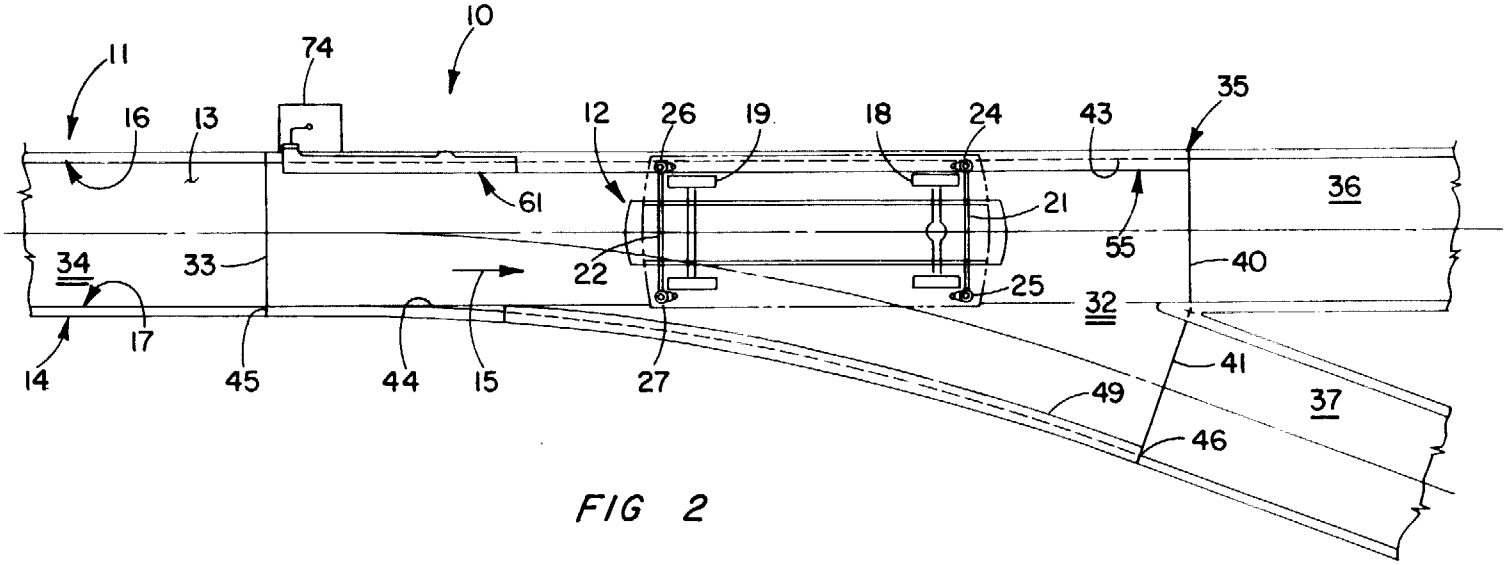
FIG. 2 is a plan view of switching apparatus constructed according to a preferred embodiment of the present invention and showing a junction of mutually diverging guideway portions and portions of a vehicle within the junction, the movable rail structure of the switching system being shown in its first position.

With reference now to FIG. 2, a preferred embodiment of the switching system 10 is employed in a guideway transportation system of the type having a guideway, indicated generally at 11, and at least one vehicle 12 adapted to travel along and follow the guideway. The exemplary guideway 11 of the present embodiment is approximately U-shaped configuration, having a substantially horizontal, central roadway 13 for supporting the vehicle 12 and suitably having a pair of approximately upright curbs or parapets 14 extending alongside the roadway on opposite sides thereof. For clarity of description, the direction indicated by arrows 15 (FIG. 2) and 15A (FIG. 3) or generally from left to right in FIGS. 2 and 3 of the drawing will be considered to be the normal or current direction of vehicular movement, it being understood that traffic in the reverse direction is also possible. The parapets 14 have respective sidewalls which face the roadway 13 and which, in compliance with the arbitrary directional sense denoted by arrows 15 and 15A, are termed left and right guide walls 16, 17. The guide walls 16, 17 of the present, illustrative guideway system are substantially perpendicular to the roadway 13 and are uniformly spaced from each other along the guideway 13. Alternatively, the guide walls 16, 17 may be sloped somewhat from the perpendicular, it being only necessary that they have some degree of vertical extension for providing lateral guidance.

The switching system 10 is suitable for use with various types of guideway following vehicles, and it is particularly adapted for use with vehicles of the type described in [the co-pending application for] U.S. Pat. *3,796,165* entitled "Guide Following Steering Apparatus", *application having been* filed on even date by W. P. Goode. The steering system of the above application is installed in a vehicle, herein illustrated diagrammatically as the vehicle 12 of FIGS. 2 and 3, which vehicle rides upon front and rear pairs 18, 19 of rubber-tired wheels, the wheels of each pair being interconnected by suitable steering linkages (not shown) preferably of the Ackerman type employed in automobiles. The front and rear steering linkages are, in turn, connected in such a manner that the wheels of the front pair 18 and of the rear pair 19 turn simultaneously and in opposite directions for causing the vehicle 12 to turn about a relatively short turning radius. The vehicle 12 is also equipped with means for [movable] *movably* engaging the guide walls 16, 17 and actuating the respective steering linkages for guiding the vehicle 12 along the guideway 11. Such means suitably includes front and rear, elongated, guideway-following structures 21, 22 which respectively extend horizontally, substantially across the guideway 11, and are positioned adjacent the front and rear pairs of wheels 18, 19, respectively. The elongated structures 21, 22 are longitudinally movable relative to their own length and laterally of the vehicle 12. Left and right, front guide wheel assemblies 24, 25, shown more clearly in FIG. 4, are fixedly joined to opposite ends of the front elongated structure 21, and left and right, rear guide wheel assemblies 26, 27 (FIG. 2) are similarly joined to the rear elongated structure 22. Each of the guide wheel assemblies 24, 25, 26, 27 includes a guide wheel (to be described below) rotatable about an approximately vertical axis and adapted to roll along a respective, adjacent guide wall, the guide wheel assemblies serving continuously to center the elongated structures 21, 22 between the guide walls 16, 17. Means are provided, as specifically disclosed in the [aboveidentified] *above identified* application, for connecting one of the elongated structures 21, 22 to the interconnected, front and rear steering linkages for guiding the vehicle 12 along the guideway 11 between the guide walls 16, 17, the steering system of the Goode patent application employing for guidance only the respective [on] *one* of the elongated structures 21, 22 which is positioned at the end of the vehicle 12 facing the current direction of travel. While directional terminology such as left, right, forward, and rearward are used herein for clarity in describing the vehicle 12 and the switching system 10, in fact, the vehicle is substantially symmetrical and is operable in either direction with equal facility, as disclosed in the Goode patent application. While the switching system 10 is described herein with reference to its use with a vehicle as disclosed in the above-cited patent application, it is not, of course, limited to such use but is suited for guideway systems employing other types of vehicles having various types of suspension and steering systems. For example, the switching system 12 is equally applicable for guideway following vehicles in which the front and rear wheels are independently and simultaneously steered by respective, front and rear, guideway following mechanisms, and the switching system may also be used with vehicles employing ground-effect suspension means and designed to follow a guideway.

With respect now to the switching system 10 of the present invention and with continued reference to FIG. 2, a junction 32 has a first end 33 communicating with a first portion 34 of the guideway 11 and *a* widened, bifurcated, second end 35 communicating with second and third, mutually diverging portions 36, 37 of the guideway, the second and third guideway portions 36, 37 being merged into the single, first guideway portion 34 at the first end 33 of the junction 32. The first and second guideway portions 34, 36 comprise, for example, portions of the primary guideway 19 of FIG. 1 while the third portion 37 comprises a portion of the secondary guideway 20.

If the direction indicated by the arrow 15 is taken as the current direction of traffic flow, the first end 33 of the junction 32 may be considered the inlet to the junction, and the second end 35 may be considered an exit end having first and second outlets 40, 41 communicating with the second and third guideway portions 36, 37, respectively. In actual operation, the switching system 10 is well suited for use in systems having bidirectional traffic flow, or it may be reversed in direction with respect to the current direction of traffic flow, as will be explained in a later section.

Parapet sections 42 *(FIG. 5)*, each of cross-sectional configuration similar to that of the parapets 14 of the guideway 11, suitably extend along opposite sides of the junction 32 and have mutually facing side surfaces which define first and second, guide wall portions 43 and 44 of configurations corresponding to those of the left and right guide walls 16, 17, respectively. The first guide wall portion 43 extends along the left side of the junction 32 and is contiguous with the respective left guide walls 16 of the first and second guideway portions 34, 36; that is, the first guide wall portion 43 is contiguous at the second end 35 of the junction 32 with the guide wall of the second guideway portion 36 spaced farthest from the third guideway portion 37. The second guide wall portion 44 extends along the opposite side of the junction 32 and has a first end 45 contiguous, at the first end 33 of the junction 32, with the right guide wall 17 of the first guideway portion 34 and a second end 46, at the second end 35 of the junction, contiguous with the guide wall of the third guideway portion 37 spaced farthest from the second guideway portion 36, i.e., contiguous with the right guide wall of the third guideway portion 37 as viewed in the drawing. The second guide wall portion 44 thus diverges continuously, in the direction from its first end 45 to its second end 46, from the first guide wall portion 43. The roadway 13 extends along the entire length of the junction 32 and at least partially across its width between the first and second guide wall portions 43, 44; the roadway 13 necessarily occupies the portions of the junction over which the wheels 18, 19 of the vehicle 12 must pass. Preferably, the roadway 13 extends continuously between the first and second guide walls portions and is continuous, or at least contiguous, with the portions of the roadway in the first, second, and third guideway portions 34, 36, 37.

Figure 4:
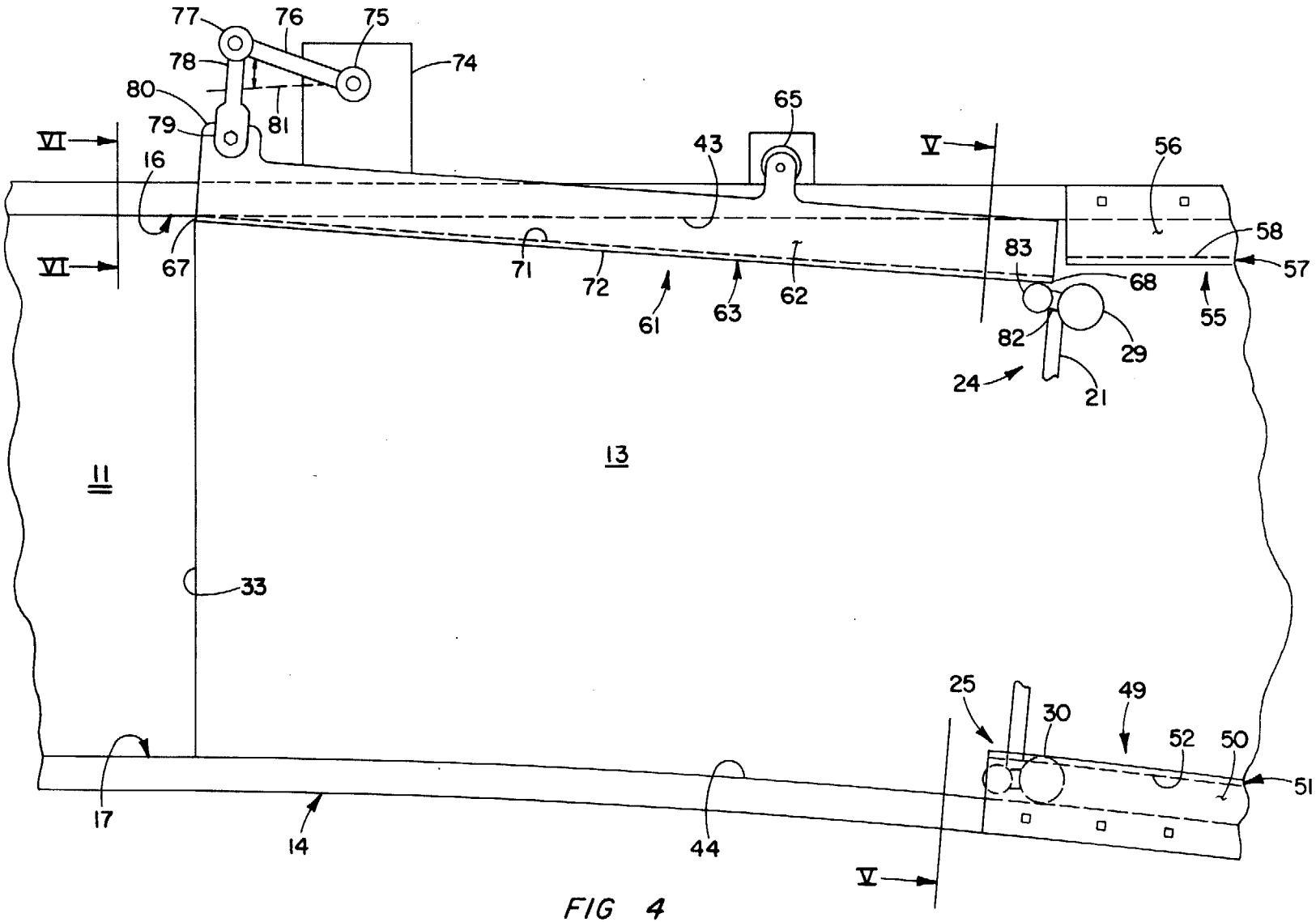
FIG. 4 is a plan view in an enlarged scale of portions of the switching apparatus of FIGS. 2 and 3, showing the movable rail structure in its second position and showing portions of the left and right, guide wheel assemblies of the vehicle.
Figure 5:
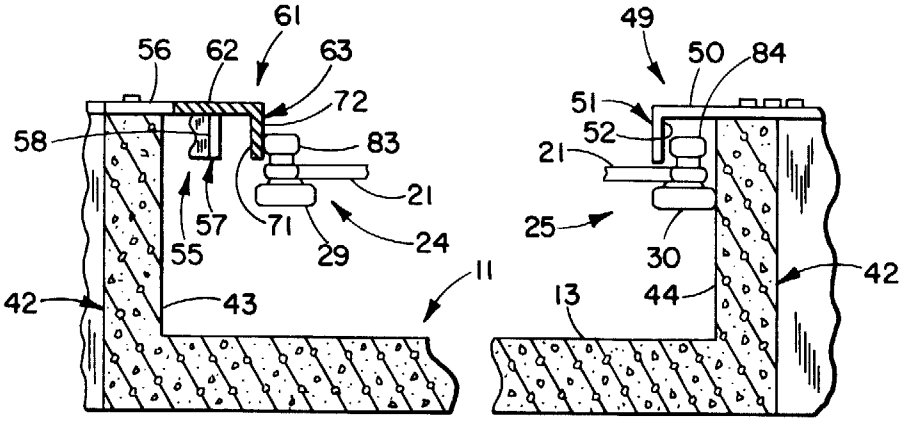
FIG. 5 is a fragmentary, cross-sectional view taken along the line V—V of FIG. 4 and showing portions of the switching apparatus in an enlarged scale relative to FIG. 4.

With added reference to FIGS. 4 and 5, a first fixed rail structure 49 of L-shaped, cross-sectional configuration is rigidly affixed to the parapet section 42 defining the second guide wall portion 44. The first, fixed, rail structure 49, in cross section, has a horizontal leg or portion 50 which, for example, is seated upon the *top* surface of the respective, adjacent, parapet section 42, is suitably bolted to the parapet section, and projects therefrom over the roadway [14] *13*. A substantially vertical rail portion projects downwardly from the distal portion of the horizontal rail portion 50 and constitutes a fixed, first guide rail 51 extending along the length of the rail structure 49.

As seen most clearly in FIG. 2 the first fixed rail structure 49 extends along the second guide wall portion 44 from the second end 35 of the junction 32 to a location on the second guide wall portion 44 spaced from the junction first end [35] *33*. The spacing of the first fixed rail structure 49 from the first end 33 of the junction 32 is such that the portion of the first fixed rail structure 49 closest to the opposite, first guide wall portion 43 is spaced from the first guide wall portion 43 by a distance at least as great as the gauge of the guideway 11, i.e., the distance between the left and right guide walls 16, 17. With particular reference to FIGS. 4 and 5, the first guide rail 51 projects downwardly from the horizontal guide rail portion 50 toward the roadway 13 and extends alongside the second guide wall portion 44 at a constant height above the roadway 13. The side of the vertical, first guide rail 51 which faces the second guide wall portion 44 constitutes a guide surface 52 which is substantially perpendicular to the roadway 13 and is continuous along the length of the first guide rail 51, the guide surface 52 being spaced from the second guide wall portion 44 by a constant, predetermined distance.

A second fixed rail structure 55 (FIG. 2), of L-shaped cross-sectional configuration corresponding to that of the first rail structure 49, extends along the first guide wall portion 43 from the second end 35 of the junction 32 toward the junction first end 33 to a location along the first guide wall portion 43 spaced from the first end 33 of the junction by a distance greater that the distance between the first end of the junction and the first fixed rail structure 49. With added reference to FIGS. 4 and 5, the second fixed rail structure 55, in cross section, has a horizontal portion 56, rigidly affixed to the parapet section 42 which defines the first guide wall portion 43, and a vertical portion projecting downwardly toward the roadway 13 and constituting a fixed, second guide rail 57. The second guide rail 57 extends alongside the first guide wall portion 43 at a constant height above the roadway 13, and preferably at a [higher] *height* equal to that of the first guide rail 51, for reasons which will become apparent. The surface of the second guide rail 57 which confronts the first guide wall portion 43 constitutes a guide surface 58 spaced from the first guide wall portion by a constant distance also preferably equal to the distance between the guide surface 52 of the first guide rail [41] *51* and the second guide wall portion 44. The guide surface 58 of the second guide rail 47 is substantially perpendicular to the roadway 13 and is continuous along the length of the second rail structure 55.

Between the first end 33 of the junction 32 and the second fixed rail structure 55 is positioned a single movable rail structure 61 (FIGS. 2–6), also of L-shaped, cross-sectional configuration and having a horizontal portion 62 and a vertical portion, constituting a movable, third guide rail 63, projecting downwardly from the horizontal portion 62 toward the roadway 13. The movable rail structure 61 is pivotably mounted upon a bearing 65 (FIG. 4) and rotatable about a rotational axis substantially perpendicular to the roadway 13. The bearing 65 is fixed relative to and preferably seated upon the parapet section 42 defining the first guide wall portion 43. The third guide rail 63 is thus pivotally supported over the roadway 13 adjacent the first guide wall portion 43. The third guide rail 63 has a first end 67 positioned adjacent the junction first end 33 and a second end 68 adjacent the second fixed rail structure 55, [and] *a* pivot point represented by bearing 65 being spaced between the first and second ends of the third guide rail and spaced from the second end 68 (for example) approximately one-third the length of the movable, third guide rail 63. With particular reference to FIG. 5, the third guide rail 63 has first and second, oppositely-facing guide surfaces 71, 72 each substantially perpendicular to the surface of the roadway 13, the first guide surface 71 confronting the first guide wall portion 43 and *the* second guide surface 72 facing toward the second guide wall portion 44.

Figure 19:
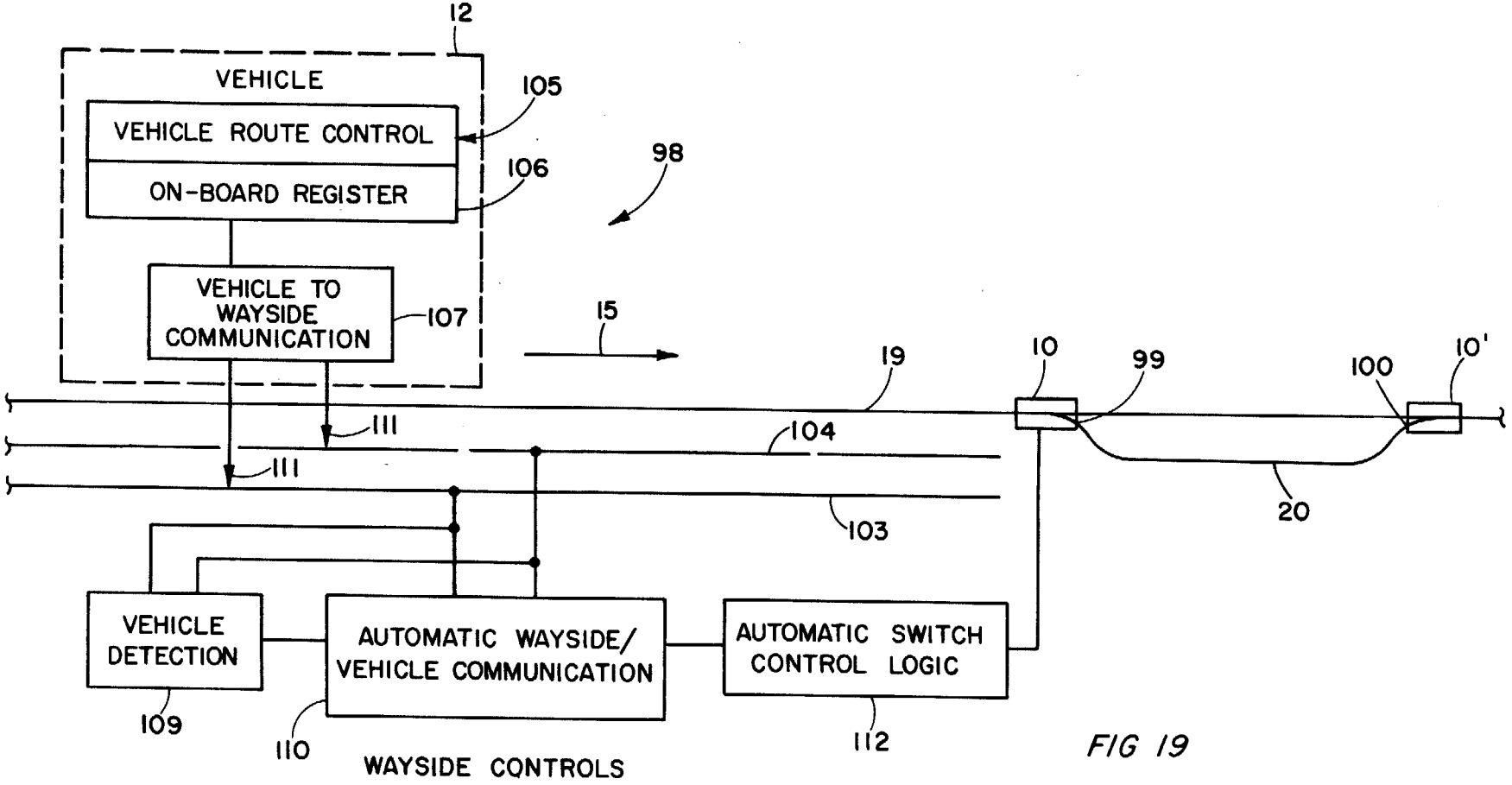
FIG. 19 is a diagrammatic view of a portion of the guideway system of FIG. 1 in an enlarged scale and showing schematically portions of a control system of a type suitable for use with switch systems constructed according to the present invention.

In the present, illustrative example of the switching system 10, the [second] *first* guide wall portion [44] *43 (FIG. 4)* and the second and third rails 57, 63 extend substantially linearly, the first and second guideway portions 34, 36 being longitudinally aligned and constituting a "through" or main route corresponding to the primary guideway 19 of FIGS. 1 and 19; the [first] *second* guide wall portion [43] *44 (FIG. 4)* and the adjacent, first guide rail 51 are curved to conform with the gradual divergence of the [first] *second* guide wall portion [43] *44* from the [second] *first* guide wall portion [44] *43*. In other embodiments of the switch 10 in which, for example, the junction 32 is in a symmetrical, Y-shaped configuration (not shown), the [second] *first* guide wall portion 43 and the second and third guide rails 57, 63 are also curved.

Figure 3:
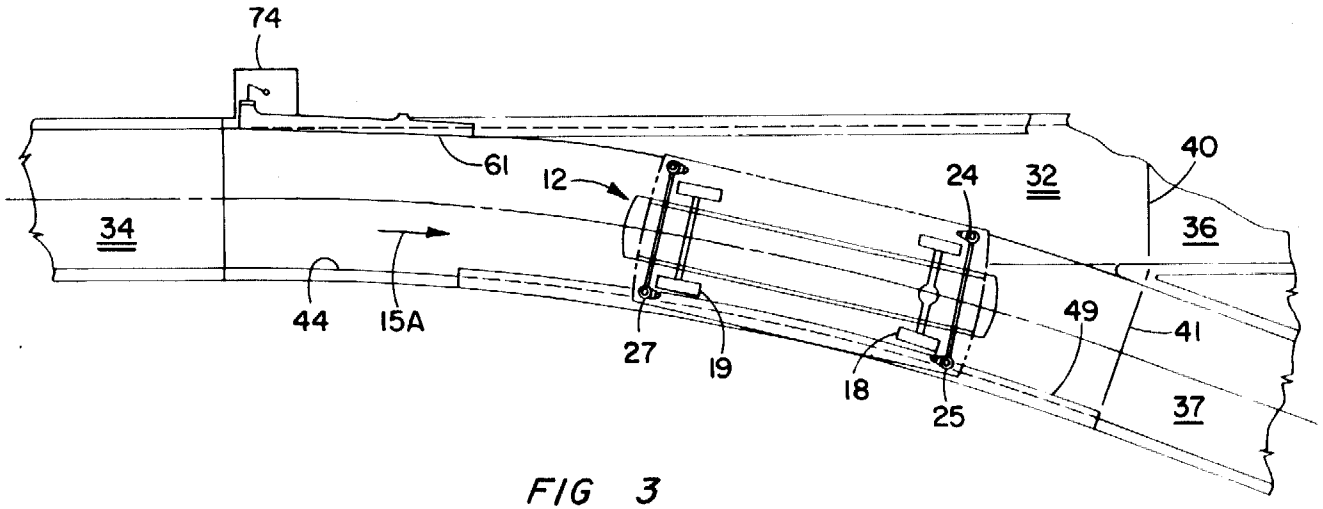
FIG. 3 is a view similar to FIG. 2 showing the movable rail structure in its second position.

The movable rail structure 61 is pivotable between a first position (FIG. 2) in which the movable rail structure 61 is longitudinally aligned with the second fixed rail structure 55 and a second, "divert" position (FIGS. 3–5). When the movable rail structure 61 is in its first position, (as shown in FIG. 2), the second end 68 (FIG. 4) of the third guide rail 63 is contiguous with the adjacent end of the second guide rail 57, and the first guide surface 71 of the third guide rail 63 is equidistant, along the length of the third guide rail, to the first guide wall portion 43; in the second position (FIGS. 3–5), the first end 67 of the third guide rail 63 is positioned immediately adjacent the first guide wall portion 43 and the second end 68 is spaced outwardly from the first guide wall portion 43 beyond the second fixed rail structure 55. The third guide rail 63 is of sufficient length, relative to the spacing between its first end 67 and the bearing 65, and is positioned in such a manner that, upon the third guide rail being in its second position (FIG. 4), the distance between the second guide surface 72 of the third guide rail 63 from the second guide wall portion 44, taken along a line perpendicular to the second guide surface 72 and intersecting the second end 68 of the third rail 63, is approximately equal to the gauge of the guideway 11, or the distance between the left and right guide walls 16, 17 across the roadway [11] *13* outside the junction 32.

In a passive "merge" switch 10' (FIGS. 20–22) to be described, no provision is made for automatically positioning the movable rail structure 61. However, in the switch 10 of FIGS. 2–6 in which the movable rail structure 61 is positioned for directing traffic toward a preselected one of the outlets 40, 41, an actuating mechanism 74 (FIG. 4) is provided for positioning the movable guide [tail] *rail* structure 61 in a selected one of its two positions, the actuating mechanism 74 suitably being of conventional design and of the type employed for actuating railway switches. One such switch actuating mechanism which can be effectively adapted for use with the present switch system 10 is manufactured by the General Railway Signal Company as Model 55-G. Inasmuch as the operation of such switch actuating mechanism is known in the art, a detailed description thereof is not deemed necessary. In summary, however, the illustrative actuating mechanism 74 is operable to rotate an axle 75 projecting upwardly from the actuating mechanism and affixed to a rotatable arm 76 extending horizontally from the axle. The distal end of the rotatable arm 76 is pivotally connected, by a suitable bearing 77, to a connecting arm 78 which is positioned above the rotatable arm 76 and which extends horizontally from the bearing 77 generally toward the first end 67 of the third guide rail 63. The end of the connecting arm 78 which is spaced from the bearing 77 is suitably provided with a horizontal clevis 79, open toward the third guide rail 63, for permitting it to be pivotally connected to a laterally extending portion 80 of the movable rail structure 61, the extending portion 80 suitably comprising an extending portion of the horizontal portion 62 of the movable rail structure 61 which extending portion 80 projects over the first guide wall portion 43 and toward the actuating mechanism 74. From the axle 75, the rotatable arm 76 extends in a direction approximately opposite to the currently employed direction of traffic flow indicated by arrow 15A, and is rotatable in a counterclockwise direction, viewed from above as in FIG. 4, to a position, indicated by the line 81, in which its distal end is moved toward the roadway [11.] *13.* This movement of the rotatable arm 76 is transmitted by the connecting arm 78 to the first end 67 of the third guide rail 63 to position the movable rail structure 61 and the third guide rail 63 in their first position; opposite or clockwise rotation of the rotatable arm 76 from the position indicated by line 81 is effective to reposition the movable rail structure 61 and third guide rail 63 in the second position, in which the first end 67 of the third guide rail is closely adjacent the first guide portion 43. In an alternative construction (not shown), the actuating mechanism 74 is provided with additional linkages to the movable rail structure 61 for locking the rail structure 61 in a selected position, for sensing the actual position of the rail structure 61, and for providing an electrical signal indicative of the position. The use of such redundant linkages as a safety measure is well-known in connection with railway switching applications and need not be shown in the drawing.

The switching system 10 additionally includes means on the vehicle 12 (FIG. 2) for engaging respective ones of the guide surfaces 52, 58, 71, and 72 (FIG. 4) as the vehicle passes through the junction 32. The continued references to FIGS. 4 and 5 and added reference to FIG. 6, the left, front, guide wheel assembly 24 has an elongated frame element 82 joined at a central portion thereof to the left end of the elongated structure 21 and suitably extending horizontally, approximately perpendicularly of the elongated structure 21. [The] *A* left, front, guide wheel 29 is affixed to and suitably positioned below the forward end of the frame element 82 upon suitable bearings seated coaxially within the guide wheel 29 and oriented such that the guide wheel 29 is freely rotatable about a rotational axis substantially perpendicular to the roadway 13. A left, front, guide roller 83 is similarly affixed to the frame element 82 and is positioned above the frame element 82 and to the rear of the guide wheel 29 upon an upright post 85 connected to the frame element 82. The frame element 82 and the guide wheel 29 are positioned below the lowermost portions of the movable guide rail 63 and the second fixed guide rail 57 and are thus free of contact with the guide rails 63, 57 during passage of the vehicle 12 (FIG. 2) through the junction 32. The post 85 supporting the guide roller 83 extends upwardly sufficiently to position the guide roller 83 in horizontal register with the second and third guide rails 57, 63. As seen most clearly in FIG. 6, the guide roller 83 is preferably offset, in the direction toward the adjacent, first guide wall portion 43, from the guide wheel 29 but is of sufficiently small diameter, relative to the diameter of the guide wheel 29, that, upon the guide wheel 29 being in contact with the first guide wall portion 43 adjacent the movable rail structure 61 when the movable rail structure is in its first or "through" position, the guide roller 83 is in register with the first guide surface 71 and positioned between the first guide surface 71 and the first guide wall portion 43. Similarly, upon the guide wheel 29 being adjacent the second fixed rail structure 55 and in contact with the first guide wall portion 43, the guide roller 83 is positioned between the first guide wall portion and the guide surface 58 of the second guide rail 57 and in register with the guide surface 58 of the second guide rail 57. The guide roller 83 is oriented such that its outermost portion, i.e., its edge portion most remote from the vehicle 12 (FIG. 2) and confronting the first guide wall portion 43, is spaced inwardly from the outermost edge of the guide wheel 29 sufficiently for the guide roller 83 to clear the forward end 67 of the third guide rail 63 upon the guide roller assembly 24 being adjacent the movable rail structure 61 when it is in its second position as shown in broken lines in FIG. 6; suitably, the horizontal spacing between the respective, outermost portions of the guide wheel 29 and the guide roller 83 is approximately equal to the thickness of the downwardly extending, third guide rail 63 so that, upon the vehicle 12 (FIG. 3) entering the junction 32 from the junction first end 33, the guide roller 83 does not impact jarringly upon the leading edge of the third guide rail 63. As shown in FIGS. 4 and 5, the right front, guide wheel assembly 25 corresponds to the left front guide wheel assembly 24 and includes a guide roller 84 and a guide wheel 30, the guide roller being positioned between the second guide wall portion 44 and the guide surface 52 of the first guide rail 51 upon the right, front, guide wheel 30 contacting the second guide wall portion 44 adjacent the first guide rail 51.

The left, rear, guide wheel assembly 26 (FIG. 2) is symmetrical with respect to the left, front, guide wheel assembly 24 but is suitably reversed from front to rear; in the vehicle 12 described in the above-identified patent application by W. P. Goode, the left, rear, guide wheel assembly 26 is adapted to follow the path of the left, front, guide wheel assembly 24 when the vehicle 12 is traveling in a forward direction and the left, "front", guide wheel assembly 24 is adapted to follow the left, "rear", guide wheel assembly 26 when the vehicle 12 travels in the opposite direction. In a system in which bidirectional traffic flow occurs and as illustrated in the present, preferred embodiment, the left guide wheel assemblies 24, 26 are also constructed symmetrically with respect to the right guide wheel assemblies 25, 27, respectively, so that the guide rollers of each guide wheel may engage respective ones of the guide surfaces 52, 58, 71, 72 during movement of the vehicle 12 in either direction along the guideway 11 as well as during operation of the vehicle when it is turned about to face in an opposite direction. Similarly, in such a bidirectional system, the first fixed rail structure 49, with its first guide rail 51, is positioned above the roadway 13 and spaced from the second guide wall portion 44 symmetrically with respect to the positioning of the second fixed rail structure 55 and the movable rail structure 61 relative to the first guide wall portion 43 and the roadway 13, to permit engagement of the respective guide surfaces by the respective, adjacent guide wheels when the vehicle 12 is turned about to face in an opposite direction.

It will be apparent to those in the art that the guide wheel assemblies 24, 25, 26, 27 and guide rails 51, 57, 63 can be inverted (not shown) such that the guide rails 51, 57, 63 project upwardly and the guide wheel assemblies project downwardly. However, the preferred embodiment of FIGS. 2–5 provides the advantage that the horizontal rail portions 50, 56, and 62 serve to cover and protect the guide surfaces and guide wheel assemblies. The horizontal portion 62 of the movable rail structure is extended over the adjacent parapet 42, in both the first and second positions of the rail structure 63, so that foreign objects are thereby prevented from becoming trapped between the movable rail structure 63 and the first guide wall portion 43.

Figure 6:
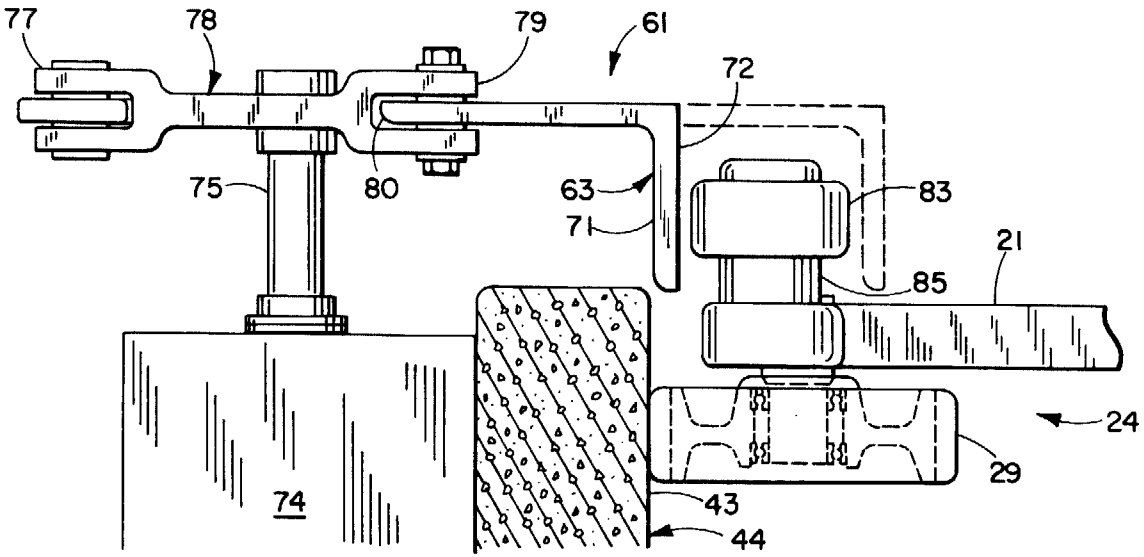
FIG. 6 is a cross-sectional view, taken partially along the line VI—VI of FIG. 4, of a portion of the switching apparatus of FIGS. 2–5 and showing the left, front, guide wheel assembly adjacent the movable rail structure.

The operation of the switching system 10 will now be described with respect to its use with the vehicle 12. In summary, and with reference to FIGS. 2 and 3, it will be seen that the single, movable rail structure 61 serves to guide a vehicle 12 entering the junction 32 from the first end 33 of the junction toward the first or the second outlet 40, 41, and that a respective one of the fixed rail structures 49, 55 then serves to continuously guide the vehicle along its initial course and through the selected outlet. Assume first that it is desired to conduct vehicles traveling in the direction indicated by arrow 15 through the first outlet 40 and onto the second guideway portion 36. If the movable rail structure 61 is in its second position as shown in FIG. 4, the actuating means 74 is energized by a control signal (according to methods known in the art) and caused to rotate the axle 75 and the rotatable arm 76 in a counterclockwise direction, as viewed from above, so that the connecting arm 78 is moved toward the guideway 11 and such that the leading end 67 of the third guide rail 63 is moved outwardly from the first guide wall portion 43 until the third guide rail 63 is longitudinally aligned with the second, fixed guide rail 57. The first guide surface 71 of the movable, third guide rail 63 is then equidistant along its length from the first guide wall portion 43. With the movable rail structure 61 thus in its first or "through" position as shown in FIG. 2, and upon a vehicle 12 entering the junction 32 from the junction first end 33, the left, front, guide wheel assembly 24 initially engages the movable rail structure 61. With reference to FIG. 6, the guide wheel 29 of the left, front, guide wheel assembly 24 is in contact with the first guide wall portion 43 as the vehicle 12 (FIG. 2) enters the junction, and the guide roller 83 of the guide wheel assembly 29 enters the space between the first guide surface 71 and the first guide wall portion 43 to become entrapped by the movable rail structure 61. As the vehicle 12 proceeds along the junction 32, the junction widens, and the second guide wall portion 44 diverges from the first guide wall portion 43 and no longer contacts the guide wheel 30 of the right guide wheel assembly 25. At this point, the left, front, guide wheel assembly 24 alone serves to guide the vehicle 12; the guide roller 83 is adapted to roll against the first guide surface 71, and serves to prevent the elongated follower structure 21 from drifting away from the first guide wall portion 43; and, the guide wheel 29 serves to limit movement of the elongated structure 21 in an opposite direction or toward the first guide wall portion 43. The front, left, guide wheel assembly 24 subsequently engages the second guide rail 57 (FIG. 4), of the second fixed rail structure 55 and continues to guide the vehicle 12 through the junction 32 alongside the first guide wall portion 43 until the vehicle leaves the junction through the first outlet 40, whereupon the guide wheels 29, 30 of the [guide rollers] *guide wheel assemblies* 24, 25 engage the guide walls 16, 17 of the second guideway portion 36 to guide the vehicle 12 along the second guideway portion. In the vehicle 12, the right and left, rear guide assemblies 27, 26 are not active in steering the vehicle 12 when the vehicle is traveling in a forward direction, and they merely track or follow the respective right and left, front guide wheel assemblies 25, 24. Thus, the left, rear, guide wheel assembly 26 follows the path of the left, front, guide wheel assembly 24 and also becomes entrapped initially by the movable rail structure 61 and subsequently by the second fixed rail structure 55 as the vehicle passes through the junction 32.

Alternatively, if a vehicle employing independent front and rear steering is employed, i.e., a vehicle wherein the front wheels 18 are steered by the front guide wheel assemblies 24, 25 while the rear wheels 19 are steered independently of the front wheels 18 by the rear guide wheel assemblies 26, 27, then the left, rear, guide wheel assembly 26 also follows the front, left, guide wheel assembly 24, as the vehicle enters the junction 32 from the junction first end 33, and also becomes engaged initially with the movable rail structure 61 and subsequently, with the second fixed rail structure 55. The left, rear, guide wheel assembly 26 in such a vehicle serves to actively steer the rear wheels 19 of the vehicle as it passes through the junction 32.

Upon the vehicle 12 entering the first end 33 of the junction 32 when the movable rail structure 61 is in its second or "divert" position as shown in FIG. 4, the third guide rail 63, of the movable rail structure 61, has its leading portion 67 positioned closely adjacent the first guide rail wall portion 43 so that the guide roller 83 of the front, left, guide wheel assembly 24 contacts the outer, second guide surface 72 instead of the first guide surface 71, thus diverting the front, elongated follower structure 21 and the vehicle 12, steered by the follower structure 21, away from the first guide wall portion 43 and toward the second guide wall portion 44, or generally toward the second outlet 41. The guide wheel 29 of the left, front, guide wheel assembly 24 is positioned below the third guide rail 63 and does not contact the guide rail 63 during the passage of the vehicle adjacent the movable rail structure 61, but the guide wheel 30 of the right, front, guide wheel assembly 25 remains in contact with the second guide wall portion 44. Thus, the vehicle 12 is steered by the guide roller 83 of the left, front, guide wheel assembly 24 and by the guide wheel 30 of the right guide wheel assembly 25 as it rolls along the second guide wall portion 44 between the junction first end 33 and the first, fixed, rail structure 49.

Figure 7:
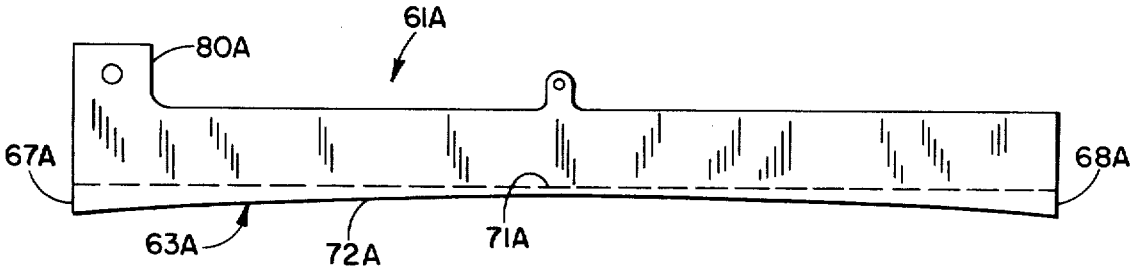
FIG. 7 is a top view of a modification of the movable rail structure of FIGS. 2–6.

It will be apparent to those skilled in the art that if the second guide surface 72 is of linear, flat configuration along the length of the movable rail structure 61 and the second guide wall portion 44 confronting the movable rail structure 61 is curved, there will be a slight deviation in spacing between the second guide surface 72 and the second guide wall portion 44 along the length of the movable rail structure 61, which deviation is greatest at the mid-portion of the movable rail structure 61. Because the divergence of the second guide wall portion 44 is preferably a gradual one, this difference in effective gauge is normally compensated for by a slight degree of play between the guide wheel assemblies 24, 25 and the second guide wall portion 44 and the second guide surface 72 and by the resilience of the guide wheels 29, 30. Alternatively, however, the length of the second guide wall portion 44 which confronts the movable rail structure 61 is of substantially flat configuration (not shown) between the first end 33 of the junction 32 and the first, fixed, rail structure 49, in which case the distance between the second guide wall portion 44 and the second guide surface 72 remains constant. In a further modification, shown in FIG. 7, the movable rail structure 61A, is constructed with the vertical, third guide rail 63A contoured such that the external, second guide surface 72A curves inwardly as it approaches the center of the guide rail structure 61A and outwardly in the direction along the guide rail 63A toward the two end portions 67A, 68A of the guide rail 63A. The external, second guide surface 72A is curved to correspond with the curvature of the opposite, second guide wall portion 44 (FIG. 4) confronting the movable rail structure 61A[, and,] *and* is positioned such that the spacing between the second guide surface 72A and the second guide wall portion 44 is uniform when the movable rail structure 61A is in its second position. The guide rail 63A is then positioned immediately above the adjacent parapet 42 (not shown) in order that its first end 67A can be pivoted over the parapet to bring the second guide surface 72A into approximate alignment with the first guide wall portion 43, when the guide wall 63A is in its second position, for engaging the guide roller 83.

With respect to the embodiment of FIGS. 4 and 5, because the spacing between the third guide rail 63 and the second guide wall portion 44 [from] *at* the second end 68 of the third guide rail 63, when the movable rail structure 61 is in its second position, is approximately equal to the spacing between the left and right guide walls 16, 17 of the guideway 11, when the movable rail structure 61 is in its second position, the right, front, guide wheel assembly 25 rides against the second guide wall portion 44 as the right guide wheel assembly 25 approaches the first fixed rail structure 49. As shown most clearly in FIG. 5, the right, front, guide wheel 30 is then positioned below the lowermost portion of the first fixed guide rail 51 and is free of contact with the guide rail 51, but it preferably does contact and roll along the second guide wall portion 44. The guide roller 84 of the right, front, guide wheel assembly 25 is in register with the guide surface 52 of the fixed, first guide rail 51, enters the space between the guide surface 52 of the first guide rail and the second guide wall portion 44, and thereby becomes captured by the first fixed rail structure 49. As shown in FIG. 3, the vehicle 12 then continues through the junction 32 alongside the second guide wall portion 44, the right, rear guide wheel assembly 27 following the right, front, guide wheel assembly 25 and also becoming captured by the first fixed rail structure 49. The rail structure 49 thus restrains the vehicle 12 alongside the second guide wall portion 44 until the vehicle 12 passes through the second outlet 41 and onto the third guideway portion 37. It is thus apparent that the vehicle 12 can be steered by only one fixed guide fail of L-shaped configuration in cooperation with the adjacent guide wall portion, and such an arrangement is suitably employed beyond the junction 32 in an alternative embodiment (not shown) wherein only one guide wall is employed along the roadway. It will be apparent that the switch 10 is also adapted to pass vehicles which are traveling in an opposite direction, or which enter the junction from one of the exits 40, 41. The movable rail structure 61 is positioned in its first position for receiving vehicles entering from the first outlet 40 and in its second position for receiving vehicles entering from the second outlet 41.

From the above description, it can be seen that the switching system 10 comprises a relatively simple yet effective switching apparatus for guideway transportation systems. The first guide surface 71 of the movable, third guide rail 63, in cooperation with the left, front, guide wheel assembly 24, comprises a first guiding means for guiding the vehicle 12 alongside the first guide wall portions 43 (or for constraining the vehicle to travel alongside the first guide wall portion) and toward the second guideway portion 36 upon the vehicle 12 entering the junction 32 from the junction first end 33 when the third guide rail 63 is in its first position; and the second guide surface 72 on the third guide rail, in cooperation with the left, front, guide wheel assembly 24, comprises a second guiding means for diverting the vehicle from the first guide wall portion 43 and guiding it toward the second guide wall portion 44 (and toward the third guideway portion 37) upon the vehicle 12 entering the junction 32 through the first end 33 thereof when the third guide rail 63 is in its second position as shown in FIG. [2] *3*. Similarly, the guide surface 58 of the fixed, second guide rail 57, in cooperation with the left, front, guide wheel assembly 24, comprises a third guiding means for constraining and guiding the vehicle 12 through the junction 32 alongside the first guide wall portion 43 and through the first outlet 40 upon the vehicle 12 being initially constrained or guided alongside the first guide wall portion 43 by the first guide surface 71 of the movable, third guide rail 63. The guide surface 52 of the fixed, first guide rail, in cooperation with the right, front, guide wheel assembly 25, comprises a fourth guiding means, for guiding the vehicle 12 through the junction 32 alongside the second guide wall portion 44 (constraining the vehicle to travel alongside the second guide wall portion) and through the second outlet 41 upon the vehicle 12 being initially diverted toward the second guide wall portion by the second guide surface 72 of the movable guide rail 63, or by the second guiding means. The third and fourth guiding means each may also be considered to comprise a respective following means or guide wheel assembly 24, 25 mounted on the vehicle 12 and a respective elongated surface (guide surfaces 58 and 52, respectively) distinct from the adjacent guide wall portions 43, 44, having vertical extension, and fixedly located relative to the guide wall portions 43, 44. The guide roller 83 of the left, front, guide wheel assembly 24 also constitutes a first guide rail following means for movably engaging the first guide surface 71 of the third guide rail 63 and subsequently, the guide surface 58 of the second rail 57, upon the vehicle 12 passing through the junction 32 from the junction first end 33 when the third guide rail is in its first position and, upon the third guide rail 63 alternatively being in its second position, for movably engaging the second guide surface 72 of the third guide rail. The guide roller 84 of the right, front, guide wheel assembly 25 also constitutes a second following means mounted on the vehicle 12 for movably engaging the fourth guiding means, i.e., the guide surface 52 of the first fixed guide rail 51, upon the vehicle 12 being initially diverted toward the second guide wall portion 44 by the second guide surface 72 of the movable guide rail 63.

*As is apparent from the above description and the drawing (FIG. 4), the movable guide rail 63 is spaced laterally, relative to the junction 32 (FIG. 2), from the guide surface 52 of the fixed, first guide rail 51, i.e., from the guide surface 52 which comprises the fourth guiding means. The second end 68 of the movable guide rail 63 is adjacent the guide surface 58 of the second, fixed rail structure 55, i.e., adjacent the guide surface 58 which comprises the third guiding means, and the movable guide rail section end 68 is positioned intermediate the guide surface 58 and 52 of the third and fourth guiding means upon the movable guide rail 63 being in its second, diverted position, as shown in FIG. 4. Expressing this relationship more specifically, the first and second guide surfaces 71, 72 extend along the movable guide rail 63 to a location adjacent its second end 68, and their portion adjacent the second end 68 of the movable guide rail 63 are intermediate the guide surfaces 58 and 52, which comprise the third and fourth guiding means, upon the movable guide rail being in its second, diverted position, as is apparent from FIG. 4. Accordingly, the scope of the present invention does not encompass a switching system in which a movable guide rail similar to the movable guide rail 63 is not spaced laterally from a guide corresponding to the guide surface 52, which guide surface 52 is adapted to guide a vehicle onto the third guideway portion 37 (FIG. 3), or in which the second end 68 of the movable guide rail 63 is not positioned intermediate the guide surfaes 58 and 52 upon the movable guide rail being in its second, diverted position. Specifically, the scope of the present invention would not encompass a switching system in which a movable guide rail, when moved to its diverted position, becomes aligned with and contiguous to a guide rail (such as rail 49) which extends to a third guideway portion diverting outwardly from a guide surface corresponding to the second guide surface 72 of the movable guide rail 63.*

Figure 8:
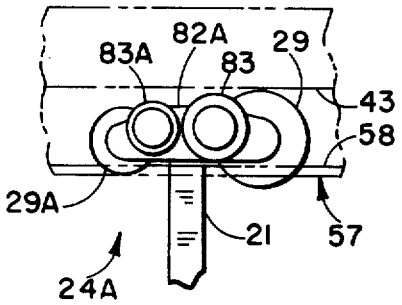
FIG. 8 is a top view of a modification of the guide wheel assembly.
Figure 9:
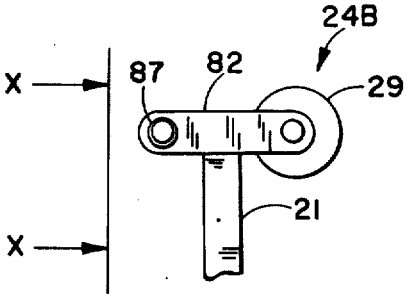
FIG. 9 is a top view of a further modification of the guide wheel assembly.
Figure 10:
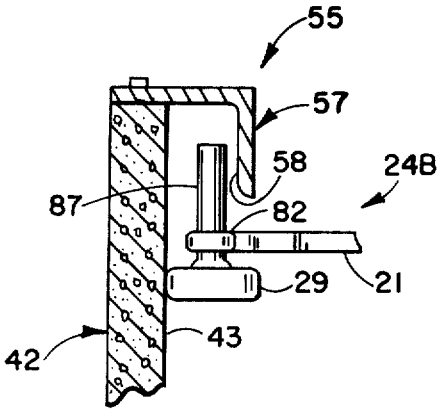
FIG. 10 is a rear view of the guide wheel assembly of FIG. 9 taken along the line X—X of FIG. 9 and showing, in cross-section, a portion of the second, fixed rail structure.

While the guide wheel assemblies 24, 25, 26, 27 of FIGS. 2–6 constitute examples of a preferred embodiment, other, modified constructions are possible. For example, it may be desirable, for safety, to employ redundant guide wheels and guide rollers, as shown in FIG. 8. In this modification, the frame 82A is enlarged and extended so that it can also support a second redundant guide wheel 29A and a redundant guide roller 83A positioned to the rear and in register with the guide wheel 29 and the guide roller 83, respectively. The redundant guide wheel 29A and guide roller 83A are each of slightly lesser diameter than the corresponding, primary guide wheel 29 and guide roller 83, respectively, so that only the primary guide wheel 29 and guide roller 83 are normally used. Should the guide roller 83, for example, fail during operation of the vehicle 12, the redundant guide roller [29A] *83A* then serves to engage the respective, adjacent guide surface 58 for ensuring safe, continuous operation. Further, while the switching system 10 is well suited for use in guideway transporation systems which carry both passengers and cargo, it is also adapted for use in less sophisticated guideway systems such as those intended for transporting cargo exclusively. In such systems, noise and vibration during operation of the system may not be as objectionable as they are during the transporting of passengers, and simpler, less expensive construction may be applicable. For example, while the use of freely rotatable guide rollers (83, 84) mounted for engaging respective ones of the guide surfaces of the several guide rails 51, 57, and 63 is preferred, rotatable guide rollers may not be required in less sophisticated systems. In an alternative configuration, as illustrated in FIGS. 9 and 10, the guide roller 83 (FIGS. 4–6) of the left, front, guide wheel assembly 24 (as well as the guide rollers of the other guide wheel assemblies) is replaced by an upright, fixed, elongated member 87 adapted to slidably engage the guide surface 58 or, alternatively, the guide surfaces 71 or 72 of the movable guide rail 63 (FIG. 6). The upright member 87 thus serves the same purpose as the guide roller 83 of FIGS. 4 and 5. The upright member 87 is preferably finished with a polished surface for minimizing friction between the member 87 and the guide surfaces 71, 72, and the guide surfaces are coated with a friction-reducing agent such as grease or graphite. A further modification of the guide wheel assembly 24 is shown (as 24C) in FIGS. 11–13. A single guide wheel 29C is employed both as guide roller for engaging respective ones of the guide surfaces and as a guide wheel for guiding the vehicle 12 along the guideway 11. The single guide wheel 29C is constructed and positioned similarly to the left, front, guide roller 83 of the preferred embodiment of FIG. 6, but extends outwardly, toward the guide rail 44 and beyond the frame 82C, so that it is free to roll along the guide wall 43 and thus guide the vehicle 12 as do the guide wheels of the guide wheel structures of the preferred embodiment. As seen in FIG. 12, the guide *wheel or* roller 29C rolls along the first guide wall portion 43 and alongside the second guide rail 57, of the second fixed rail structure 55. In FIG. 13, the embodiment of FIGS. 11 and 12 is [positioned as] *shown with* the single guide wheel 29C

[rolls] against the second guide surface 72 of the movable rail structure 61 when the rail structure 61 is in its second or "divert" position. An advantage of the preferred embodiment of FIGS. 2–6 when compared with the embodiment of FIGS. 11–13 is that the guide rollers and guide wheels turn in a single rotational direction in all instances. In the modification illustrated in FIGS. 10–13, however, the single guide wheel 29C may be caused to roll alternately against the first guide wall portion 43 and, for example, the guide surface 58 of the second guide rail 57 (FIG. 12), causing its direction of rotation to reverse sharply and thus causing greater wear of the roller 29C than occurs with the embodiment of FIGS. 2–6. This can be minimized by biasing the steering of the vehicle 12 such that the vehicle tends to bear to the left or right, according to principles well-known in the art.

While the switching system 10 has been described thus far with reference to its use with a U-shaped guideway 11, it is not limited to such an application. Other guideway systems exist in which the vehicles are not guided by upright angle walls but rather are adopted to follow other guiding means, such as *at least one* guide rail extending parallel to the roadway. For example, and with reference to FIG. 14, a modified switching system 10C is installed in a guideway system which employs a guideway 11C having a central guide rail 81, for guiding a vehicle 12C, rather than left and right guide walls 16, 17 (FIG. 2), the alternative guideway 11C consisting only of a horizontal roadway 13C and the central guide rail 81 projecting upwardly therefrom and extending parallel to the direction of travel. A vehicle 12C similar to the vehicle 12 of FIGS. 2 and 3 also has a front and rear, elongated follower structures 21C, 22C. The vehicle 12C also has horizontally mounted guide wheels for following appropriate guide surfaces, but the guide wheels, such as the front, left and right guide wheels 29C, 30C, are adapted to engage and roll upon respective, opposite side surfaces of the center guide rail 81 for guiding the vehicle 12C. The typical, front guide wheels 29C, 30C are mounted horizontally beneath the front elongated structure [21A] *21C*, for example, adjacent and to either side of the center thereof.

Figure 11:
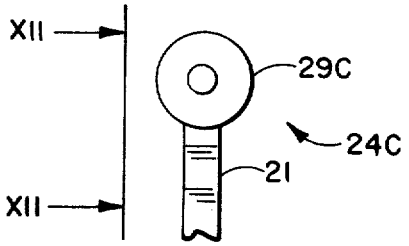
FIG. 11 is a top view of still another modification of the guide wheel assembly.
Figure 12:
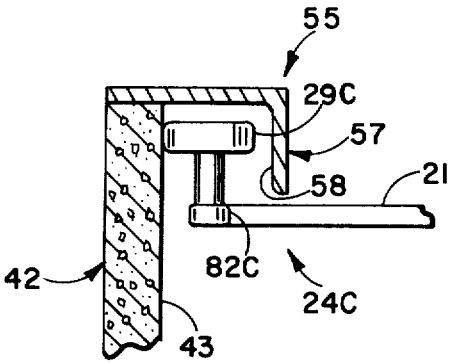
FIG. 12 is a view, similar to FIG. 10 and taken along the line XII—XII of FIG. 11, showing the guide wheel assembly of FIG. 11 engaged by a portion of the second, fixed rail structure.
Figure 13:
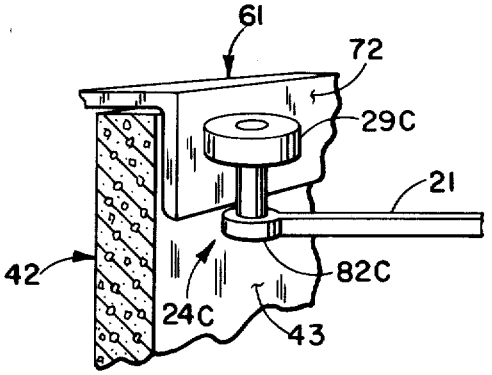
FIG. 13 is a rear, perspective view of the guide wheel assembly of FIGS. 11 and 12 and showing a portion of the movable rail structure in its second position.
Figure 16:
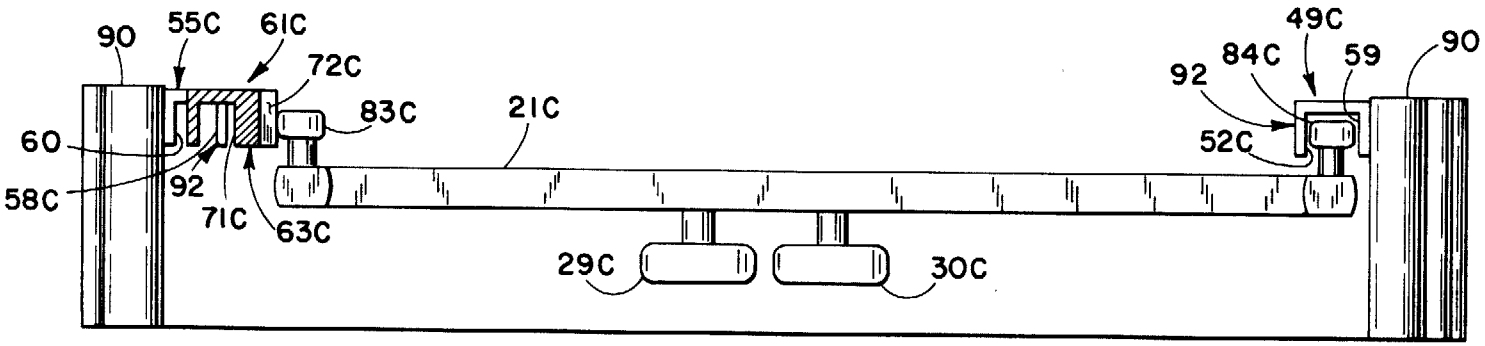
FIG. 16 is a cross-sectional view, taken as on the line XVI—XVI of FIG. 15, of portions of the modified switching system of FIGS. 14 and 15.

With reference to FIG. 16, the representative, front follower structure 21C also has left and right guide rollers 83C, 84C respectively mounted on the left and right end portions of the follower structure 21C and each projecting upwardly therefrom, the left and right guide rollers being of substantially the same configuration as the guide rollers illustrated by the single guide roller 29C FIGS. 11–13.

A junction 32C, of first, second, and third portions 34C, 36C, 37C of the guideway 11C, is of a configuration, in plan, similar to the junction 32 (FIGS. 2 and 3) of the initially described guideway system employing a U-shaped guideway. The junction 32C is provided with first and second, fixed rail structures 49C, 55C and with a movable rail structure 61C. The fixed rail structures 49C, 55C are positioned as are the first and second, fixed rail structure 49, 55 of the embodiment of FIGS. 2–6 but are suitably supported by a plurality of upright posts 90 mutually spaced along both sides of the junction 32C. The movable rail structure 61C is supported by the single bearing 65 which is seated upon a suitable foundation [9] *91*. Actuating means 74 are also provided for positioning the movable rail structure 61C as in the previous embodiment. With reference to FIG. 16, the fixed rail structures 49C and 55C are of U-shaped configuration, each having two, mutually spaced, downwardly projecting legs 92. The fixed rail structures 49C, 55C are adapted to engage respective ones of the guide rollers 83C, 84C when the rollers become positioned between the legs 92 of a respective one of the fixed rail structures, the guide rollers 83C, 84C being positioned in horizontal register with the legs 92 and being of smaller diameter than the spacing between the legs of the respective rail structures. The respective inner legs 92 of each fixed rail structure 49C, 55C (which are closest to the center of the junction 32C) have guide surfaces 52C and 58C which correspond to the guide surfaces 52, 58 of FIGS. 2–6. The opposite, outer leg 92 of the first fixed rail structure 49C defines a guide surface 59 which conforms the guide surface 52C, and the outer leg 92 of the second fixed rail structure 55C defines a guide surface 60 which confronts the guide surface 58C.

Figure 15:
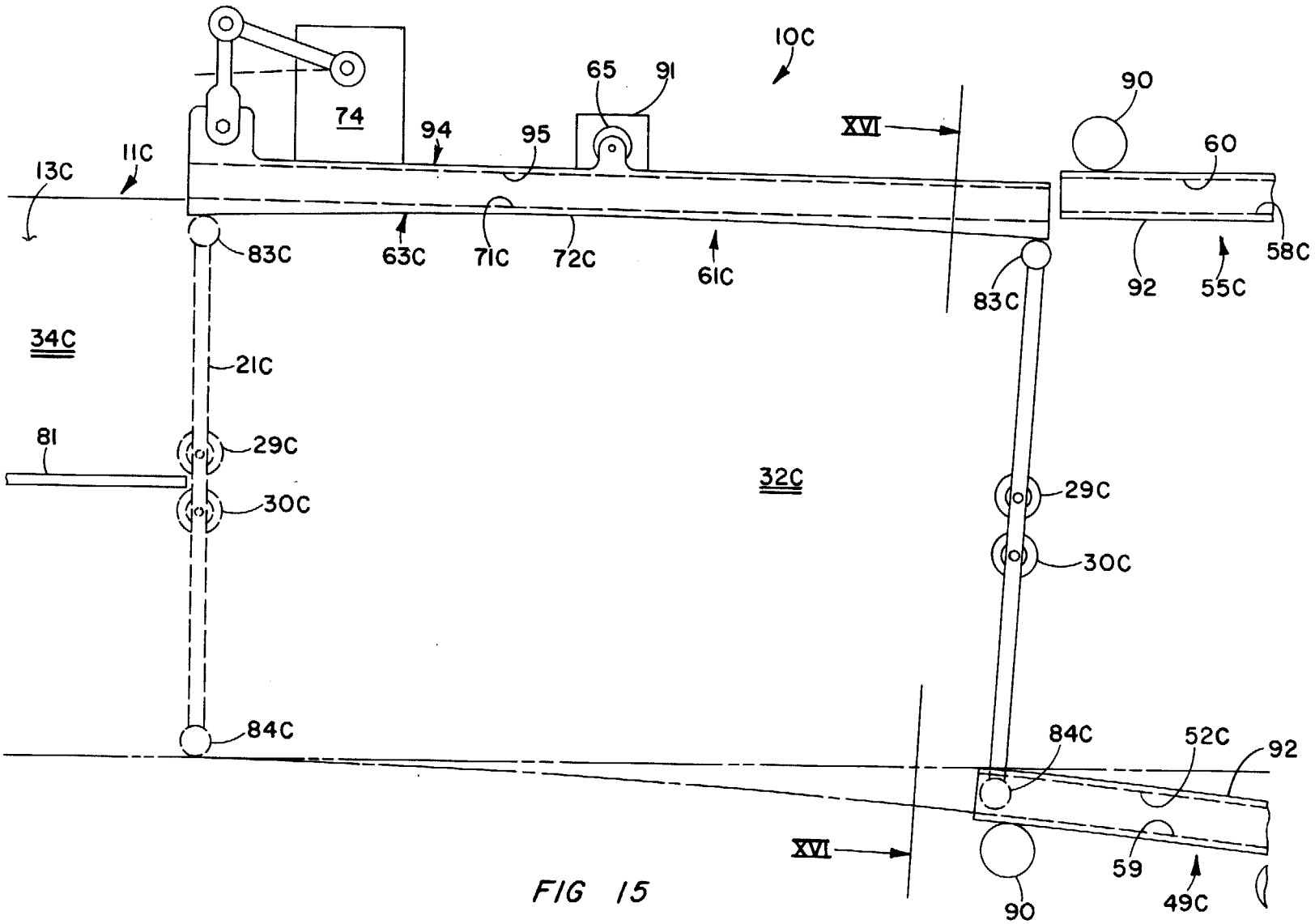
FIG. 15 is a plan view, similar to FIG. 4, of the modification of FIG. 14.

With added reference to FIG. 15, the movable rail structure 61C is also of U-shaped, cross-sectional configuration over most of its length and has a downwardly projecting, third guide rail 63C having first and second guide surfaces 71C and 72C corresponding to the first and second guide surfaces 71 and 72 of the movable, third guide rail 63 of the initially described embodiment. The first guide surface 71C is flat, along the length of the movable rail structure 61C, while the second guide surface 72C is curved and diverges from the first guide surface 71C toward the two ends of the guide rail 63C as in the embodiment illustrated in FIG. 7. The movable rail structure 61C also has an outer leg 94 spaced from the third rail structure 63C and defining a third guide surface 95 which confronts and extends parallel to the first guide surface 71C.

Figure 14:
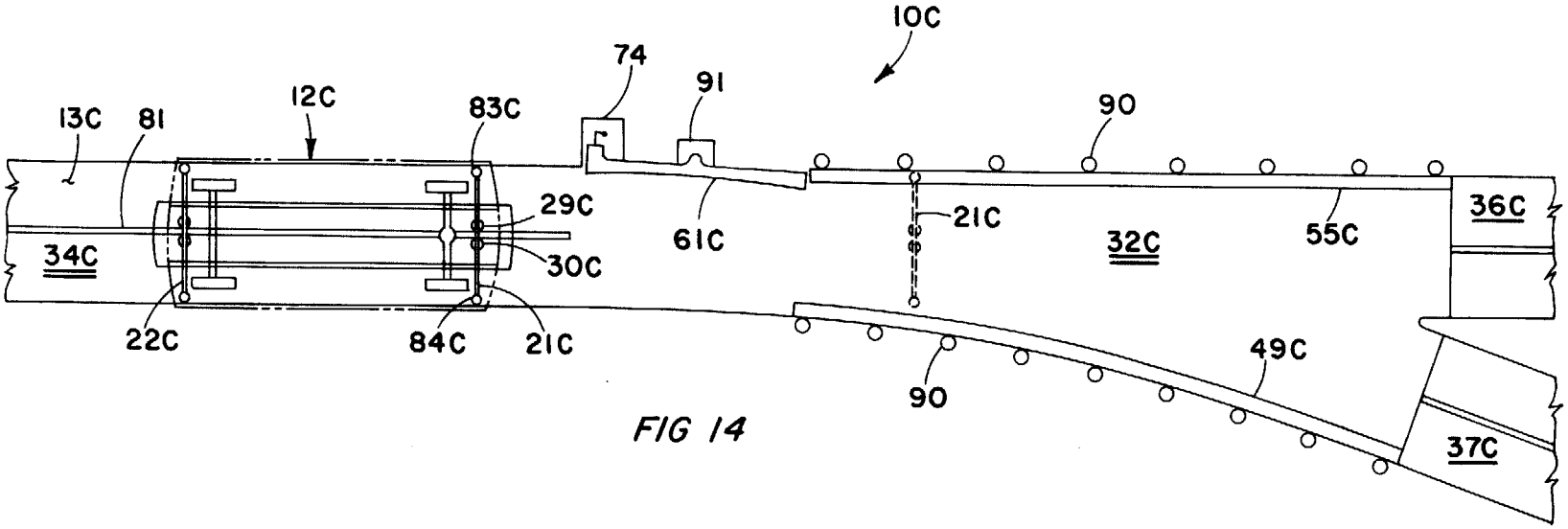
FIG. 14 is a plan view, similar to FIG. 2, showing a modification of the switching system of FIGS. 2–6.

The operation of the modified switching system 10C of FIGS. 14–16 is essentially the same as that of the previous embodiment but differs therefrom in that (1) the vehicle 12C is guided by the centered guide rail 81 as it enters the junction 32C, and (2) the U-shaped rail structures 49C, 55C, and 61C are operative to engage respective ones of the guide rollers (83C, 84C) without added cooperation from adjacent guide wall portions such as the first and second guide wall portions 43, 44 of FIGS. 2 and 3. As shown in FIG. 15, the front, elongated follower structure 21C is centered within the guideway 11C by engagement of the guide wheels 29C, 30C with the central guide rail 81 as the vehicle 12C approaches the junction 32C while in the first guideway portion 34C. The left, front, guide roller 83C is then in register with the movable rail structure 61C upon the vehicle 12C entering the junction [32] *32C* from the first guideway portion 34C, and the guide roller 83C becomes engaged by a respective one of the guide surfaces 71C, 72C as in the initially described embodiment. With continued reference to FIG. 15, the left, front, guide roller 83C (shown in broken lines as it initially engages the movable rail structure 61C) engages the second, outer guide surface 72C upon the movable rail structure 61C being in its second position, and the second guide surface 72C gradually diverts the follower structure 21C and the vehicle 12C (FIG. 14) toward the opposite side of the junction 32C or generally toward the third guideway portion 37C (FIG. 14). The gentle curvature of the outer surface 72C (and of the surface 72A of FIG. 7) serves to minimize the jerk (more precisely, the rate of lateral acceleration of the vehicle) toward the opposite side of the junction 32C and, because of the inertia of the vehicle 12C which acts against the diverting force exerted by the second guide surface 72C, the vehicle continues to roll alongside the movable rail structure 61C with its front, left, guide roller 83C in contact with the second guide surface 72C until the follower structure 21C passes the movable rail structure 61C. Alternatively, the second guide surface 72C may be of a continuously increasing curvature, from its leading end to its second end (not shown). As shown in solid lines in FIGS. 15 and 16, the right, front, guide roller [83C] *84C* becomes engaged between the downwardly extending legs 92 of the first fixed rail structure 49C before the follower structure 21C looses guiding contact with the second guide surface 72C of the movable rail structure 61C, and the first fixed rail structure 49C then serves to guide the vehicle 12C through the junction 32C and onto the third guideway portion 37C. Alternatively, if the movable rail structure 61C is in the first position, in which it is longitudinally aligned with the second fixed rail structure 55C, the left, front, guide wheel 83C becomes engaged between the first and third guide surfaces 71C and 95 of the movable rail structure 61C and the vehicle 12C is guided along the left side of the junction 23C by the movable rail structure, and subsequently by the second fixed rail structure 55C, whereupon it emerges from the junction onto the second guideway portion 36C. As in the previous embodiment of FIGS. 2–6, the guide rollers of the rear follower structure 22C are adapted to follow the front guide rollers 83C, 84C, respectively. When the U-shaped rail structures, as exemplified by rail structures 49C, 55C, 61C, are employed with vehicles 12C having single guide rollers, as exemplified by guide rollers 83C, 84C, it may be desirable to minimize frictional forces created by back-and-forth movement of the guide rollers when engaged between the downwardly projecting legs of respective ones of the rail structures. This is suitably accomplished by biasing the steering of the vehicle 12C to the left, according to practices well known in the automotive art and as mentioned with respect to the embodiment of FIGS. 10–12, in order to cause the vehicle 12C to bear gradually to its left so that the guide rollers will normally contact only one of the guide surfaces defined by the vertical legs of the rail structures. A leftward rather than rightward bias is desirable in this case to prevent the vehicle 12C from wandering away from the second guide surface 72C of the movable rail structure 61C when the movable rail structure 61C is in its second position.

As in the embodiment of FIGS. 2–6, the embodiment of FIGS. 14–16 provides a reliable and effective switch system suited for continuous use in a guideway system. The first guide surface 71C of the movable, third guide rail [63] *63C*, in cooperation with the guide roller 83C and the guide surface 95, provides a first guiding means for guiding the vehicle [12] *12C* toward the second guideway portion 36C upon the vehicle entering the junction 32C from the first guideway portion 34C when the guide rail 63C is in its first position; and the second guide surface 72C of the third guide rail 63C in cooperation with the left, front, guide roller 83C, constitutes a second guiding means for diverting the vehicle 12C toward the third guideway portion 37C upon the vehicle entering the junction 32C from the first guideway portion 34C when the movable guide structure 61C is in its second position. The guide surface 58C of the second fixed rail structure 55C, in cooperation with the adjacent guide surface 60 and with the left, front, guide roller 83C, constitutes a third guiding means for guiding the venicle 12C through the junction 32C and onto the second guideway portion 36C upon the vehicle being initially guided by the first guide surface 71C of the movable, third guide rail [63] *63C*, and the guide surface 52C of the first fixed rail structure 49C, in cooperation with the adjacent guide surface 59 and the right, front, guide roller 84C of the vehicle 12C, constitutes a fourth guiding means, for guiding the vehicle 12C through the junction 32C and onto the third guideway portion 37C upon the vehicle 12C being initially guided by the second guide surface 72C of the movable, third guide rail 63C.

The movable, third guide rail 63C (as well as the third guide rail of the embodiments of FIGS. 2–13 and 17–18, to be described) also comprises a guiding means operable for constraining the vehicle 12C from turning toward the third guideway portion 37C upon the vehicle entering the junction 32C from the junction first end 33 (FIG. 2) when the movable guide rail is in its first position and for guiding a vehicle toward the third guideway portion 37C upon the vehicle entering the junction 32C from the junction first end when the movable guide rail 63C is in its second position. Similarly, the second fixed rail structure 55C (55) also comprises another guiding means operative for guiding a vehicle 12C through the junction 32C and onto the second guideway portion 36C upon the vehicle being initially constrained by the movable, third guide rail 63C. Finally, the first fixed rail structure 49C (49) comprises yet another guiding means, which is operative for guiding the vehicle 12C through the junction 32C and onto the third guideway portion 37C upon the vehicle 12C being initially guided toward the third guideway portion 37C by the third guide rail 63C.

Figure 17:
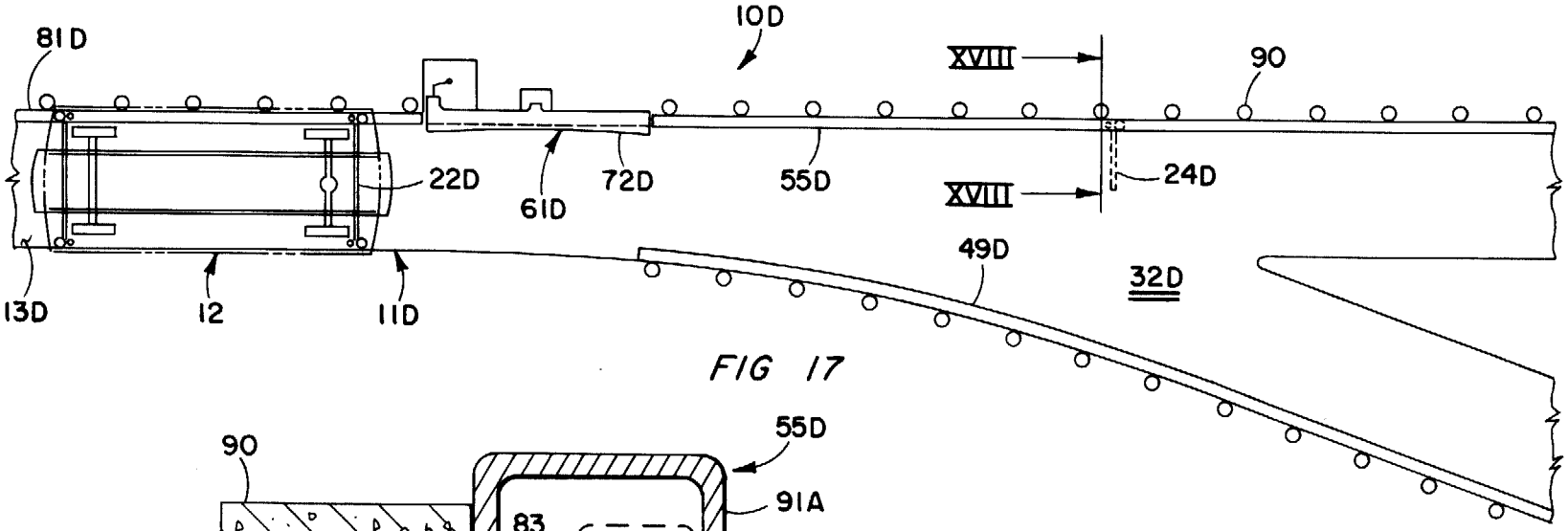
FIG. 17 is a plan view, similar to FIGS. 2 and 14, of another modification of the switching system.
Figure 18:
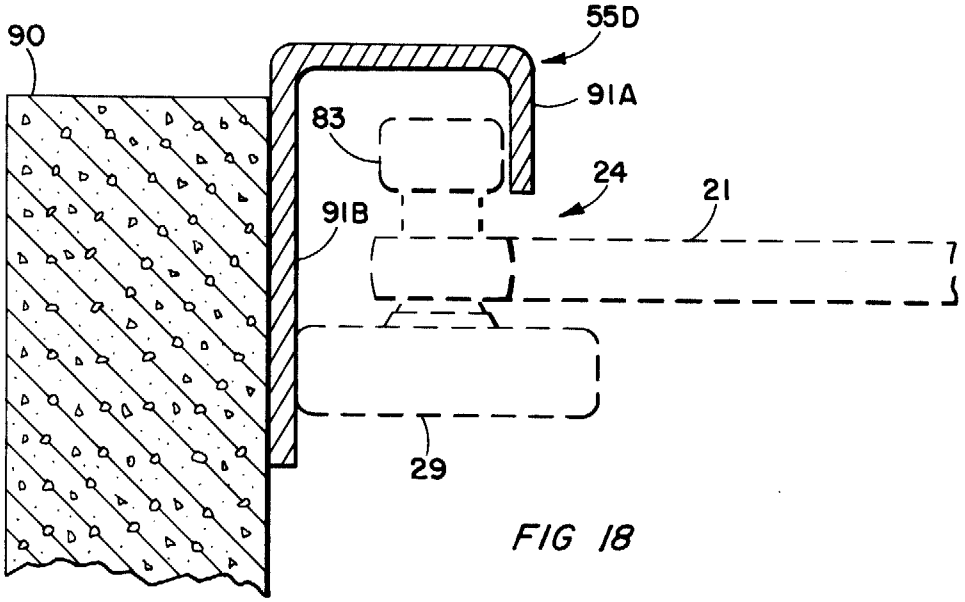
FIG. 18 is a fragmentary, cross-sectional view taken as on the line XVIII—XVIII of FIG. 17 *and on an enlarged scale;*

In a further modification of the switching system, identified as switch 10D in FIG. 17 and 18, the U-shaped rail structures 49C, 55C, 61C of FIGS. 14–16 are modified to permit their cooperation with the vehicle guide wheel assemblies 24, 25, 26, 27 of the preferred embodiment shown in FIGS. 2–6. Referring to FIG. 18, the second, fixed, rail structure 55D, as an example, has an outer leg 91B adjacent the edge of the junction 32D and an inner leg 91A, as does the rail structure 55C of FIGS. 14–16, but the outer leg 91B projects downwardly past the inner leg 91A for a distance sufficient to permit its engagement, for example, with the guide wheel 29 of the guide wheel assembly 24. Thus, the guide wheel 29 and the guide roller 83 are adapted to roll against the mutually facing, inner surfaces defined by the legs 91B and 91A, respectively, and the follower structure 21 is caused to follow the rail structure 55D. The movable rail structure 61D is suitably formed with a curved, second guide surface 72D, as in the embodiment of FIGS. 14–16.

The modified switch system 100D is operative in the same manner as the embodiment described with reference to FIGS. 14–16. It will be noted that the assymetrical rail structure configuration, exemplified by rail structure 55D, is suited for guiding the vehicle 12 along the guideway 11D throughout the guideway system. As shown in FIG. 17, guide rails 81D, of the assymetrical U-shaped configuration described with respect to rail structure 55D, are suitably mounted on posts 90 and extended alongside the roadway 13D, the guide rails 81D serving to guide the vehicle 12 upon the roadway 13D as does the center rail 81 of the embodiment of FIGS. 14–16.

Figures 20, 21, 22:
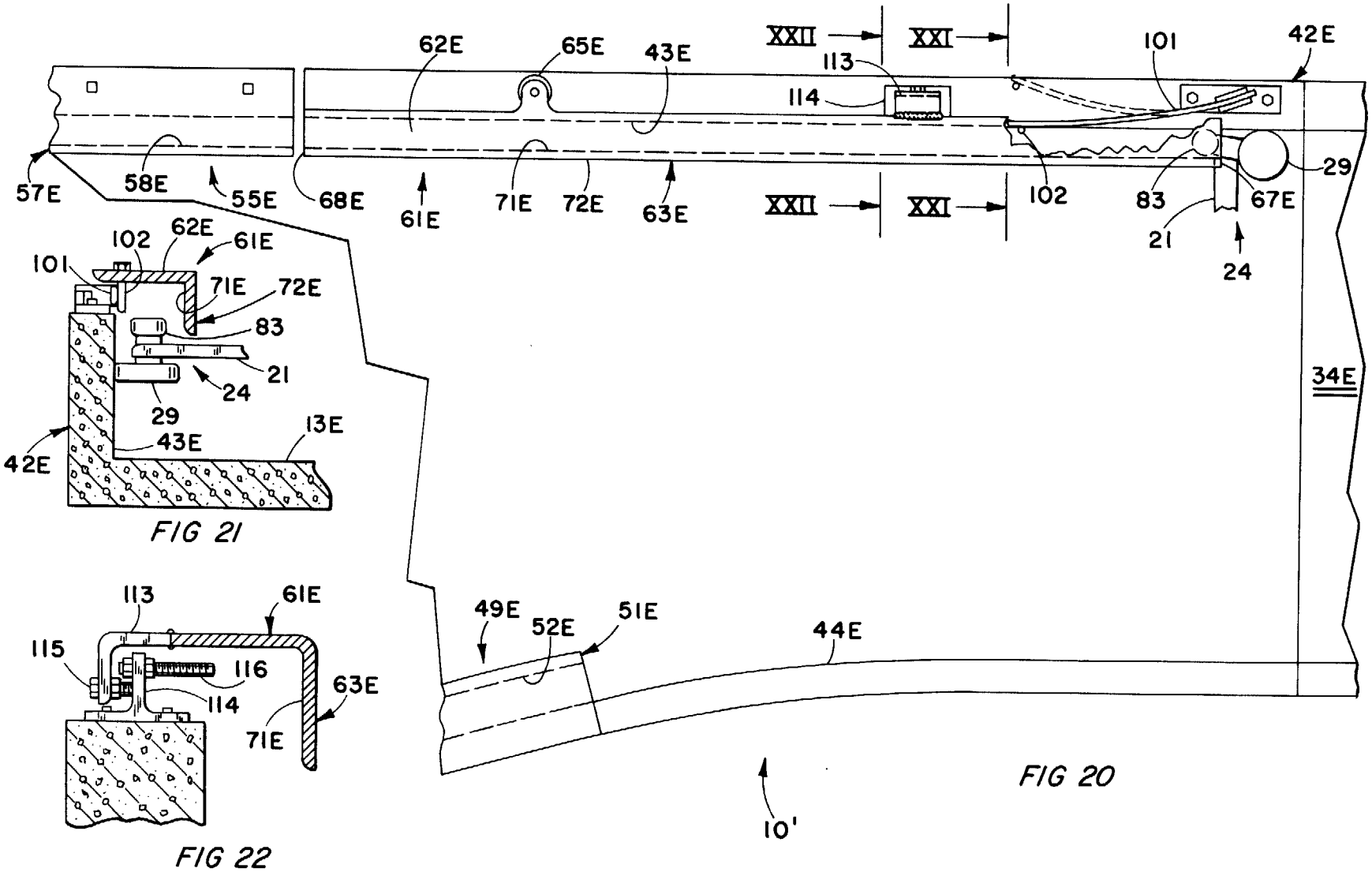
FIG. 20 is a view, partially cut away, and similar to FIG. 4, of a further modification of the switching system which is particularly adopted for receiving vehicles entering from its bifurcated, second end.
FIG. 21 is a fragmentary, cross-sectional view taken as on the line XXI—XXI of FIG. 20.
FIG. 22 is a fragmentary, cross-sectional view taken as on line XXII—XXII of FIG. 20.

With reference to FIGS. 20 and 21, the switch 10' employed in the guideway system 9 of FIG. 1 is suitably of a further modification which is adapted for use as a "passive" switching apparatus. It will be noted that the junction 32E has its bifurcated end directioned toward the oncoming traffic, i.e., in a reversed direction from that of the switch 10 of FIGS. 2–6. As shown in FIG. 19, a secondary guideway 20 of the guideway system 9 suitably extends alongside the primary guideway 19 and serves as a siding for permitting loading and unloading of passengers. The secondary guideway 20 includes an entrance 99 and an outlet 100, the entrance being connected to the second outlet 41 (FIG. 2) of the switch 10 and the exit being connected to the corresponding "outlet" of the second, oppositely directioned, passive switch 10', such that the secondary guideway 20 again merges with the primary guideway 19 (into first guideway portion 34E). Referring to FIGS. 20 and 21, the switch 10' has first and second, fixed rail structures 49E and 55E, and a movable rail structure 61E, corresponding to the rail structures 49, 55, and 61 of the embodiment of FIGS. 2–6, but no actuating mechanism 74 (FIG. 4) is employed. The first fixed rail structure 49E includes a downwardly projecting, fixed, first guide rail 51E defining a guide surface 52E corresponding to guide surface 52 of FIGS. 4–6, and the second fixed rail structure 55E includes a downwardly projecting, second guide rail 57E defining a guide surface 58E corresponding to guide surface 58 of the embodiment of FIGS. 2–6.

A leaf spring 101 is bolted to the upper portion of the parapet defining the first guide wall portion 43E and is positioned adjacent the first end 67E of the third guide rail 63E. The leaf spring 101 extends, approximately horizontally, toward the second fixed rail structure 55E and is positioned immediately below the horizontal portion 62E of the movable rail structure 61E and immediately above the top of the parapet 42E. A bolt or pin 102 is affixed to the horizontal portion 62E of the movable rail structure 61E and extends downwardly through a bore formed through the horizontal rail portion 62E (FIGS. 21) adjacent the movable, third guide rail 63E and adjacent the distal end of the leaf spring 101. The leaf spring 101 is biased toward the [vertical] *movable* third guide rail 63E or away from the [third] *first* guide wall portion 43E and is positioned in register with the pin 102 so that it slidably engages the pin 102 and urges the pin and the adjacent portion of the movable rail structure 61E outwardly from the [second] *first* guidewall portion 43E. As shown in FIG. 21, the leaf spring 101 and pin 102 are positioned above the guide roller 83 of the representative, left, front, guide wheel assembly 24 so that the guide roller 83 is not prevented from contacting the first guide surface 71E and from passing between the guide surface 71E and the first guide wall portion 43E as in the embodiments previously described. Means are also provided for limiting the pivotal movement of the movable rail structure 61E, such means preferably including an L-shaped, projecting member 113, having vertical and horizontal portions, which is suitably welded to the distal edge of the horizontal portion 62E of the rail structure 61E in such a manner that it extends outwardly therefrom, its vertical portion projecting downwardly toward the parapet 42E. The L-shaped, projecting member 113 is positioned adjacent the pin 102 and between the pin 102 and the bearing 65E.

As shown more clearly in FIG. 22, a T-shaped stop member 114 is also bolted to the parapet 42E upon the upper surface of the parapet 42E and adjacent and in register with the L-shaped member 113. The T-shaped stop member 114 is inverted such that its stem portion projects upwardly beside the projecting member 113. An adjustable bolt structure, termed the first check bolt 115, extends horizontally through a bore formed through the downwardly projecting leg of the L-shaped member 113 and is fastened in place by two nuts threaded upon it and seated against opposite sides of the member 113, the bolt 115 being adjusted to engage the T-shaped stop member 114 when the movable rail structure 61E is in the first position in which it extends parallel to the first guide wall portion 43E. A second check bolt 116 is similarly mounted through a bore extended through the T-shaped stop member 114 and projects toward the third guide rail 63E. The second check bolt 116 is adjusted to contact and stop the rail structure 61E in its "divert" or second position and to prevent damaging contact of the first end 67E of the third guide rail 63E with the first guide wall portion 43E.

In operation, the movable rail structure 61E is normally restrained in its first or "through" position, as shown in FIG. 20, because of the action of the leaf spring 101. A vehicle which enters the junction 32E from the primary guideway 19 (of FIG. 19) is thus conducted through the junction 32E by the initial engagement of its left, front, guide wheel assembly 24. (FIGS. 2 and 3) with the guide surface 58E of the second fixed rail structure 55E, and subsequently by engagement with the movable rail structure 61E. A vehicle which enters the junction 32E from the secondary guideway 20 of FIG. 19 is initially guided by the guide surface 52E of the first fixed rail structure 49E, which engages the right, front, guide wheel assembly 25 (FIGS. 2 and 3) and guides the vehicle alongside the second side guide wall portion 44E until the guide [wheel] *roller* 83 of the left, front, guide wheel assembly 24 contacts the second guide surface 72E of the movable rail structure 61E. As the vehicle continues, the guide roller 83 overcomes the force of the spring 101 and forces the rail structure 61E to pivot, in a counter-clockwise direction, into its second or "divert" position, thus permitting the vehicle to pass. After the vehicle leaves the junction 32E, the spring 101 again moves the movable rail structure 61E to its first or "through" position as shown in FIG. 20. It can thus be appreciated that the passive switch apparatus 10' of FIGS. 20–22 is well suited for use as a "merge only" switch wherein there is no need for directive positioning of the switch as in the "active" switch system initially described. Because no actuating or control mechanisms are required, such a passive switch system 10' can be manufactured at considerably less expense than active switch systems; their extensive use at the respective exit ends 100 of a plurality of secondary guideways 20 (FIG. 1) of a guideway system can thus provide a considerable economical advantage when compared with systems in which positively actuated switches are used for both the entrance and the exit ends of secondary guideways.

In both the passive switch system 10' of FIGS. 20–22 and the active switch system 10 particularly guiding of FIGS. 2–6, the fourth guiding means, or the guide surface 52 (52E) of the fixed, first guide rail 51 (51E), in cooperation with the right, front, guide wheel assembly 25, also comprises a means for guiding a vehicle toward the first guideway portion of FIGS. 2–3 (equivalent to the first guideway portion 34E, or the portion of the primary guideway 19 past the secondary switching system 10' of FIG. 19) upon the vehicle entering the junction 32 (32E) from the third [guidway] *guideway* portion 37 (equivalent to the secondary guideway of FIG. 19). The third guiding means, or the guide surface 58, (58E) of the second fixed guide rail 57 (57E), in cooperation with the left, front, guide wheel assembly 24, also comprises a means for guiding a vehicle toward the first guideway portion upon the vehicle entering the junction 32 (32E) from the second guideway portion 36 (equivalent to the portion of the primary guideway 20 in front of the switch 10', FIG. 19). The first guiding means, or the first guide surface 71 (71E) of the third, movable guide rail 63E, *together with the left front guide wheel assembly,* also comprises a means for guiding a vehicle through the junction 32 (32E) and onto the first guideway portion 34 (34E) upon the vehicle being initially guided by the third guiding means (including guide surface 68 (68E). In the case of the embodiment of FIGS. 2–6, the movable guide rail 63E is positioned in its first position by the actuating mechanism 74, and in the case of the embodiment of FIGS. 20–22, by the leaf spring 101. The second guiding means, or the second guide surface 72 (72E) of the movable, third guide rail 63 (63E) in cooperation with the left, front, guide wheel assembly 24 of the vehicle, also comprises a means for guiding the vehicle through the junction 32 (32E) and onto the first guideway portion 34 (34E) upon the vehicle being initially guided by the fourth guiding means (comprising guide surface 52E).

It will be noted that in each embodiment, positioning means are provided for moving the movable, third guide rail 63 (63E) from its second to its first position. With respect to the "active" switch embodiment of FIGS. 2–18, such means comprises the actuating mechanism 74, which mechanism constitutes an actuator means operable for selectively moving the movable, third guide rail 63 (63E) between its first and second positions. With respect to the "passive" embodiment of FIGS. 20–22, the leaf spring 101 and the associated pin 102 constitute the positioning means and are operable for resiliently urging the movable rail structure 61E to its first position.

Because the switching system 10, in both its active and passive embodiments, is of relatively simple, rugged construction, employing only one major movable part, it is capable of reliable operation over extended periods of time. Therefore, the switching system is well suited for use in a complex guideway transportion system in which a plurality of such switches is employed and in which the active switches 10 are frequently actuated, by automatic controls, in order to provide continuous circulation of vehicles over a network of guideways. As was discussed with respect to the guideway system 9 of FIG. 1, reliability of operation is of great importance in guideway systems in which a continuous, circulatory flow of traffic is required because of the possibility that malfunction of any one of the switches 10 (10') may interrupt the operation of the entire system 9 or result in accidental injury to passengers or bystanders. Control systems suitable for use in such an automated guideway transportation system 9 are suitably of the type currently in use in advanced, railway control systems. As an example, and with reference now to FIG. 19, a portion of a control system 98 operable for automatically positioning the active switches 10 of the guideway system 9 is illustrated in conjunction with portions of the primary guideway 19 and with one of the secondary guideways 20. Inasmuch as the construction of such control apparatus is generally known with respect to usage in railway control systems, a detailed description thereof is not deemed necessary here; the following outline is suggestive only and is provided by way of illustration of the cooperation of the present switch system 10 (10') with such control apparatus.

Alongside the primary guideway 19 ahead of the switch 10 extend electrically conductive bars or rails; these include a continuous ground rail 103 and several signal [rais] *rails* 104 aligned end-to-end along the guideway 19 but electrically insulated from each other to define a plurality of discrete, positional blocks, or lengths of guideway 19, each spaced a known distance ahead of the switch 10. A vehicle, represented by the block 12, is provided with route control logic circuitry 105 including an on-board register unit 106 comprising computer memory devices which are operable to store information both identifying [and] *a* vehicle and denoting its programmed route through the system. A vehicle 12 which approaches the switch 10 on the portion of the primary guideway 19 adjacent the first of the signal rails 104 is sensed by a wayside, vehicle detection circuit 109 connected across the ground rail 103 and the respective signal rail 104, the detection circuit 109 then serving to activate an automatic wayside/vehicle communication circuit 110. It will be apparent to those skilled in the art, for example, that a relay could suitably be incorporated in the detection circuit 109 for providing a positive signal to the wayside communication circuit 110. The wayside communication circuit 110 then interrogates the vehicle as to its identification and programmed route. A vehicle-to-wayside communication cicuit 107 aboard the vehicle is operative to transmit, at periodic intervals, a signal indicative of the information stored in the on-board register 106 as to the vehicle identity and programmed route. Transmittal of information between the vehicular communication circuit 107 and the wayside/vehicle communication circuit is accomplished by conduction through contact brushes 111 slidably associated with the rails 103, 104 or, alternatively, by the induction of electrical signals to the rails. The wayside/vehicle communication circuit 110, upon its being activated by the vehicle detection circuit 109, reads the next emission of the vehicle-to-wayside communication circuit 107 as to the information stored in the on-board register 106. Having received this information concerning route and vehicle identity, the automatic wayside/vehicle communication circuit 110 transmits the information to the automatic switch control logic circuit 112 which then translates the information into a control signal for positioning correctly the switch 10 as well as subsequent, adjacent switches (not shown) in accordance with the preselected route; the control signal actuates the switch 10 if the switch is not in the appropriate position. Various other control circuits, outside the scope of this disclosure, are also connected to the vehicle 12 through the wayside/vehicle communications circuit 110 for performing other functions such as the automatic control of velocity and braking. The passive switch 10' then serves to conduct the vehicle back to the primary guideway 19, the resiliently biased rail structure 63E serving to permit passage through junction 32E of vehicles entering from either the secondary guideway 20 or the primary guideway 19. No control signal is necessary for positioning of the rail structure 63E but sensing devices (not shown) may be installed therein for monitoring its operation.

It can thus be appreciated that the switching system is adapted to provide highly reliable service over long periods of time. Because it employs only one [,] movable [,] track portion, it eliminates the need for complex actuating mechanisms operable for simultaneously aligning multiple [,] movable [,] track elements as in the prior art system initially described. Further, the movable rail structure is of relatively simple, one-piece construction and is mounted by means only of a relatively simple bearing structure. In the preferred embodiment in which L-shaped rail structure having downwardly projecting guide rails are used, the danger of the switch becoming jammed as a result of foreign objects falling alongside the movable rail elements is greatly reduced. This is because the movable rail structure does not sweep across the surface of the roadway, but is rather suspended above the roadway surface; moreover, because the space between the movable third guide rail and the adjacent, first guide wall portion is covered by the horizontal portion of the movable rail structure, accidental or even intentional placement of foreign objects in that space is made quite difficult. Such failsafe construction is of particular advantage when the switch system is to be installed in a public area, such as an airport, through which large numbers of people pass and in which the danger of vandalism and the possibility of foreign objects being accidentally thrown onto the guideway are always present.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. In a transportation system of the type employing vehicles adapted to travel along a guideway comprising a roadway and structure providing at least one guide surface, having vertical extension, extending along the guideway for guiding the vehicle, the system including a pluraity of guideway junctions, each junction having a first end communicating with a first portion of the guideway and a widened, bifurcated, second end communicating with second and third, mutually diverging portions of the guideway, the transportation system including at least one primary guideway and at least one secondary guideway, having inlet and outlet ends, connected to the primary guideway by respective, oppositely directioned switching systems, the transportation system further including programmable control means for sensing the positions of the respective vehicles and for automatically actuating respective ones of the switching systems at appropriate times in response to the movement of the respective vehicles and according to respective, preselected routes programmed in the control system with respect to each vehicle, an improved switching system adapted for use in such a transportation system, the switching system comprising:

a single movable guide rail positioned adjacent the first end of the junction and pivotable about an approximately vertical axis between first and second positions;

first guiding means, comprising a first guide surface on the movable guide rail, for guiding a vehicle toward the second guideway portion upon the vehicle entering the junction from the junction first end when the movable guide rail is in its first position; [and]

second guiding means, comprising a second guide surface on the movable guide rail, for guiding a vehicle toward the third guideway portion upon the vehicle entering the junction from the junction first end when the movable guide rail is in its second position, third guiding means [, immovably positioned between the movable guide rail and the second guideway portion,] for guiding a vehicle through the junction and onto the second guideway portion upon the vehicle being initially guided by the first guiding means and comprising a guide surface defined by a structure *immovably positioned between the movable guide rail and the second guideway portion;* and fourth guiding means [, immovably positioned between the first end of the junction and the third guideway portion,] for guiding a vehicle through the junction and onto the third guideway portion upon the vehicle being initially guided by the second guiding means, *the fourth guiding means comprising a guide surface defined by a structure immovably positioned between the first end of the junction and the third guideway portion, the movable guide rail being spaced laterally, relative to the junction, from the guide surface of the fourth guiding means, the movable guide rail having a first end adjacent the junction first end and a second end adjacent the guide surface of the third guiding means and between the structure of the third guiding means and the junction first end, the first and second guide surfaces extending along the movable guide rail to a location thereon adjacent the movable guide rail second end, the portions of the first and second guide surfaces adjacent the movable guide rail second end being intermediate the respective guide surfaces of the third and fourth guiding means upon the movable guide rail being in its second position.*

2. The switching system of claim 1, wherein the fourth guiding means comprises a means for guiding a vehicle toward the first guideway portion upon the vehicle entering the junction from the third guideway portion, wherein the third guiding means comprises a means for guiding a vehicle toward the first guideway portion upon the vehicle entering the junction from the second guideway portion, wherein the second guiding means comprises a means for guiding a vehicle through the junction and onto the first guideway portion upon the vehicle being initially guided by the fourth guiding means, and wherein the first guiding means comprises a means for guiding a vehicle through the junction and onto the first guideway portion upon the vehicle being initially guided by the third guiding means.

3. In a transportation system employing at least one vehicle adapted to travel along a guideway having two mutually spaced guide walls having vertical extension, the system including a first guideway portion and second and third, mutually diverging guideway portions each having a pair of mutually spaced guidewalls having vertical extension, a switching system comprising:

a junction of the first, second, and third portions of the guideway, the junction having a first end which communicates with the first guideway portion and a widened, second end having a first outlet communicating with the second guideway portion and a second outlet communicating with the third guideway portion, the junction having a first guide wall portion contiguous, at the first end of the junction, with one of the guide walls of the first guideway portion and contiguous, at the second end of the junction, with the guide wall of the second guideway portion spaced farthest from the third guideway portion, and a second guide wall portion extending between the other guide wall of the first guideway portion and the guide wall of the third guideway portion spaced farthest from the second guideway portion, the second guide wall portion diverging from the first guide wall portion in the direction, along the second guide wall, from the junction first end to the second outlet;

a single movable guide rail positioned adjacent the first guide wall portion and extending from the first end of the junction to a location between the junction first and second ends, the movable guide rail being pivotable about a substantially vertical axis between a first position, in which the movable guide rail is equidistant, along its length, from the first guide wall portion, and a second position in which the movable guide rail diverges from the first guide wall portion and toward the second guide wall portion in the direction, along the movable guide rail, from the first end and toward the second end of the junction;

first guiding means, on the movable guide rail, for constraining the vehicle to travel alongside the first guide wall portion upon the vehicle entering the junction from the junction first end when the movable guide rail is in its first position;

second guiding means, on the movable guide rail, for diverting the vehicle from the first guide wall portion and toward the second guide wall portion upon the vehicle entering the junction through the junction first end when the movable guide rail is in its second position;

third guiding means for constraining the vehicle to travel through the junction alongside the first guide wall portion and through the first outlet upon the vehicle being initially constrained to travel alongside the first guide wall portion by the first guiding means; and fourth guiding means for constraining the vehicle to travel through the junction alongside the second guide wall portion and through the second outlet upon the vehicle being initially diverted toward the second guide wall portion by the second guiding means.

4. The switching system of claim 3, the third and fourth guiding means each comprising a respective following means mounted on the vehicle and a respective, elongated surface distinct from the guide wall portions, having vertical extension, and fixedly located relative to a respective one of the first and second guide wall portions of the junction.

5. The switching means of claim 4, the following means of the third guiding means being operative for engaging the elongated surface of the third guiding means upon the vehicle having entered the junction first end when the movable guide rail is in its first position, and the following means of the fourth guiding means being operative for engaging the elongated surface of the fourth guiding means upon the vehicle having entered the junction first end when the movable guide rail is in its second position.

6. The switching system of claim 3, further comprising positioning means for moving the movable guide rail from its second to its first position.

7. The switching system of claim [3] *6*, the positioning means comprising means resiliently urging the movable guide rail to its first position.

8. The switching system of claim [3] *6*, the positioning means comprising an actuator operable for selectively moving the movable guide rail between its first and second positions.

9. The system of claim 3, the guideway having an approximately horizontal roadway extending at least partially between the first and second guide wall portions of the junction and the movable guide rail being positioned over the roadway and between the first and second guide wall portions.

10. The system of claim 3, wherein the first guiding means comprises a guide surface extending along the length of the movable guide rail, facing the first guide wall portion, and equidistantly spaced along its length from the first guide wall portion when the movable guide rail is in its first position, and wherein the second guiding means comprises a guide surface extending along the length of the movable rail and facing toward the second guide wall portion.

11. The system of claim 3, wherein there is provided a first, fixed guide rail immovably supported adjacent the second guide wall portion, the fourth guiding means comprising a guide surface extending along the first fixed guide rail and confronting the second guide wall portion, and wherein there is further provided a second fixed guide rail immovably supported adjacent the first guide wall portion, the third guiding means comprising a guide surface extending along the second fixed guide rail and confronting the first guide wall portion.

12. In a transportation system employing at least one vehicle adapted to travel along a guideway, the guideway comprising a roadway bordered by left and right, mutually parallel, approximately upright guide walls, each vehicle having apparatus including left and right guide walls following structures adapted to ride against the left and right guide walls, respectively, for guiding the vehicle along the roadway between the guide walls, a switching system comprising:

a junction of a first portion of the guideway and of second and third, mutually diverging portions of the guideway, the junction having a first end communicating with the first guideway portion and at which the mutually diverging, second and third guideway portions are merged, and a bifurcated, widened, second end communicating with the second and third guideway portions, the junction having a first guide wall portion extending between respective ones of the guide walls of the first and second guideway portions and a second guide wall portion having a first end contiguous with the other guidewall of the first guideway portion and a second end located adjacent the second end of the junction and contiguous with the guide wall of the third guideway portion spaced farthest from the second guideway portion, the second guide wall portion diverging, from its first to its second end, from the first guide wall portion;

a first guide rail immovably positioned over the roadway adjacent the second guide wall portion and extending alongside the second guide wall portion at a constant height above the roadway, the first guide rail having a guide surface substantially perpendicular to the roadway, continuous along the length of the first guide rail, facing the second guide wall portion, and spaced from the second guide wall portion by a constant, predetermined distance, the first guide rail extending from the second end toward the first end of the second guide wall portion, the first guide rail being spaced from the junction first end and spaced from the first guide wall portion by a distance at least as great as the spacing between the left and right guide walls of the guideway;

a second guide rail immovably positioned over the roadway adjacent the first guide wall portion and extending alongside the first guide wall portion at a constant height above the roadway, the second guide rail having a guide surface substantially perpendicular to the roadway, continuous along the length of the second guide rail, facing the first guide wall portion, and spaced from the first guide wall portion by a constant, predetermined distance, the second guide rail extending from the bifurcated, second end of the junction toward the junction first end and being spaced from the junction first end by a distance greater than the distance between the junction first end and the first guide rail;

a third guide rail constituting a single, movable guide rail; having first and second ends and pivotally supported over the roadway adjacent the first guide wall portion and between the second guide rail and the first end of the junction, the third guide rail having first and second, oppositely facing guide surfaces each substantially perpendicular to the roadway, the first guide surface of the third guide rail facing the first guide wall portion, the third guide rail being pivotable, about a rotational axis substantially perpendicular to the roadway and spaced between the first and second ends of the third guide rail, between a first position in which the second end of the third guide rail is contiguous with the second guide rail and in which the first guide surface of the third guide rail is equidistant, along its length, from the first guide wall portion, and a second position in which the first end of the third guide rail is positioned immediately adjacent the first guide wall portion and in which the third guide rail second end is spaced, from the first guide wall portion, beyond the second guide rail and in which the distance between the second guide wall portion and the second guide surface of the third guide rail, along a line perpendicular to the second guide wall portion and intersecting the second end of the third guide rail, is substantially equal to the distance between the left and right guide walls of the guideway;

first guide rail following means, mounted on the at least one vehicle, for movably engaging the first guide surface of the third guide rail, and subsequently, the guide surface of the second guide rail, upon the vehicle passing through the junction from the junction first end when the third guide rail is in its first position and, upon the third guide rail alternatively being in its second position, for movably engaging the second guide surface of the third guide rail and diverting the vehicle toward the second guide wall portion; and second guide rail following means, mounted on the vehicle, for movably engaging the guide surface of the first guide rail and guiding the vehicle along the second guide wall portion and into the second portion of the guideway upon the vehicle being diverted toward the second guide wall portion by the first guide rail following means.

13. The switching system of claim 12, wherein the first guide rail following means comprises a first guide roller rotatable about an axis perpendicular to the roadway and having a diameter less than the spacing between the first guide wall portion and the guide surface of the second guide rail and less than the spacing between the first guide wall portion and the first guide surface of the third guide rail upon the third guide rail being in its first position, and wherein the second guide rail following means comprises a second guide roller rotatable about an axis perpendicular to the roadway and having a diameter less than the spacing between the first guide rail and the second guide wall portion, the second guide roller being positioned between the first guide rail and the second guideway portion upon the first guide roller being adjacent the second end of the third guide rail and in contact with the second guide surface of the third guide rail when the third guide rail is in its second position.

14. The switching system of claim 12, further comprising a first guide wheel mounted on the vehicle adjacent the first guide roller, the first guide wheel being spaced vertically from the third guide rail along the first guide roller being in contact with the third guide rail and spaced vertically from the second guide rail upon the first guide roller being in contact with the second guide ral, and a second guide wheel mounted on the vehicle adjacent the second guide roller, the second guide wheel being spaced vertically from the first guide rail upon the second guide roller wheel being in contact with the first guide rail.

15. The switching system of claim 14, wherein the first guide wheel is adapted to contact and roll along the first guide wall portion upon the vehicle being adjacent the first guide wall portion, the first guide roller being spaced from the first guide wall portion, upon the first guide wheel contacting the first guide wall portion, by a distance approximately equal to the thickness, between the first and second guide surfaces, of the third guide rail.

16. The switching system of claim 14, wherein the first and second guide wheels respectively confront and are each adapted to roll along a respective one of the guide walls, external of the junction, and each constituting a respective portion of a respective one of the left and right guide wall following structures.

17. The switching system of claim 12, wherein the first and second guide rails constitute portions of first and second, fixed, L-shaped rail structures, respectively, and the third guide rail constitutes a portion of a movable, L-shaped rail structure, each rail structure having, in cross-section, a horizontal portion extending between the respective guide rail and the respective, adjacent, guide wall portion.

18. The switching system of claim 17, wherein the first and second guide wall portions respectively constitute mutually consfronting sidewalls of first and second upright curbs extending along respective sides of the junction, and wherein the horizontal portions of the first and second L-shaped rail structures extend over and are rigidly affixed to the second and first curbs, respectively, and wherein the horizontal portion of the third L-shaped rail structure extends over and is pivotally mounted on the first curb.

19. The switching system of claim 17, wherein the first, second, and third guide rails project downwardly from the horizontal portions of the respective L-shaped rail structures.

20. In a transportation system employing at least one vehicle adapted to travel along a guideway comprising a roadway and structure providing at least one guide surface, having vertical extension, extending along the guideway for guiding the vehicle, the system having a junction having a first end communicating with a first portion of the guideway and a widened, bifurcated, second end communicating with second and third, mutually diverging portions of the guideway, a switching system comprising;

a single movable guide rail positioned adjacent the first end of the junction and pivotable about an approximately vertical axis between first and second positions;

first guiding means, comprising a first guide surface on the movable guide rail, for guiding a vehicle toward the second guideway portion upon the vehicle entering the junction from the junction first end when the movable guide rail is in its first position; [and]

second guiding means, comprising a second guide surface on the movable guide rail, for guiding a vehicle toward the third guideway portion upon the vehicle entering the junction from the junction first end when the movable guide rail is in its second position, third guiding means[, immovably positioned between the movable guide rail and the second guideway portion,] for guiding a vehicle through the junction and onto the second guideway portion upon the vehicle being initially guided by the first guiding means *and comprising a guide surface defined by a structure immovably positioned between the movable guide rail and the second guideway portion*; and fourth guiding means[, immovably positioned between the first end of the junction and the third guideway portion,] for guiding a vehicle through the junction and onto the third guideway portion upon the vehicle being initially guided by the second guiding means *and comprising a guide surface defined by a structure immovably positioned between the first end of the junction and the third guideway portion, the movable guide rail being spaced laterally, relative to the junction, from the guide surface of the fourth guiding means, the movable guide rail having a first end adjacent the junction first end and a second end adjacent the guide surface of the third guiding means and between the guide surface of the third guiding means and the junction first end, the first and second guide surfaces extending along the movable guide rail to a location adjacent the movable guide rail second end, the portions of the first and second guide surfaces adjacent the movable guide rail second end being intermediate the respective guide surfaces of the third and fourth guiding means upon the movable guide rail being in its second position.*

21. The switching system of claim 20, wherein the first and second guide surfaces constitute guide surfaces extending along opposite sides of the movable guide rail.

22. The switching system of claim 21, including following means mounted on the vehicle and operative for engaging the first guide surface of the movable guide rail upon the vehicle entering the junction from the junction first end when the movable guide rail is in its first position and for engaging the second guide surface of the movable guide rail upon the vehicle entering the junction from the junction first end when the movable guide rail is in its second position.

23. The switching system of claim 20, wherein the fourth guiding means also comprises a means for guiding a vehicle toward the first guideway portion upon the vehicle entering the junction from the third guideway portion, wherein the third guiding means comprises a means for guiding a vehicle toward the first guideway portion upon the vehicle entering the junction from the second guideway portion, wherein the second guiding means comprises a means for guiding a vehicle through the junction and onto the first guideway portion upon the vehicle being initially guided by the fourth guiding means, and wherein the first guiding means comprises a means for guiding a vehicle through the junction and onto the first guideway portion upon the vehicle being initially guided by the third guiding means.

24. The switching system of claim 23 and further comprising positioning means for moving the movable guide rail from its second to its first position.

25. The switching system of claim 24, the positioning means comprising means resiliently urging the movable guide rail to its first position.

26. The switching system of claim 24, the positioning means comprising an actuator operable for selectively moving the movable guide rail between its first and second positions.

27. In a transportation system employing at least one vehicle adapted to travel along a guideway having an approximately horizontal roadway extending between left and right, approximately upright guidewalls, the system including a first guideway portion and second and third, mutually diverging guideway portions, a switching system comprising:

a junction of the first, second, and third portions of the guideway, the junction having a first end which communicates with the first guideway portion and at which the second and third guideway portions are merged and a widened, bifurcated, second end having a first outlet communicating with the second guideway portion and a second outlet communicating with the third guideway portion, the junction, having a first guide wall contiguous, at the first end of the junction, with one of the guide walls of the first guideway portion and contiguous, at the second end of the junction, with the guide wall of the second guideway portion spaced farthest from the third guideway portion, and a second guide wall portion extending between the other guide wall of the first guideway portion and the guide wall of the third guideway portion spaced farthest from the second guideway portion, the second guide wall portion diverging from the first guide wall portion in the direction, along the second guide wall, from the junction first end to the second outlet, the roadway extending between the first and second guide wall portions;

a first fixed rail structure, of L-shaped cross-sectional configuration, extending along the second guide wall portion from the second end of the junction to a location spaced from the first end of the junction, the first, fixed rail structure having a horizontal portion and a vertical portion comprising a first guide rail portion projecting downwardly toward the roadway and extending alongside the second guide wall portion at a constant height above the roadway, the first guide rail portion having a guide surface substantially perpendicular to the roadway, continuous along the length of the first guide rail portion, facing the second guide wall portion, and spaced from the second guide wall portion by a constant predetermined distance, the first guide rail portion being spaced from the first guide wall portion by a distance at least as great as the spacing between the guide walls of the guideway portions;

a second, fixed rail structure, of L-shaped cross-sectional configuration, extending along the first guide wall portion from the second end of the junction to a location spaced from the first end of the junction by a distance greater than the distance between the junction first end and the first rail structure, the second, fixed rail structure having a horizontal portion and a vertical portion, comprising a second guide rail portion, projecting downwardly toward the roadway and extending alongside the first guide wall portion at a constant height above the roadway, the second guide rail portion having a guide surface substantially perpendicular to the roadway, continuous along the length of the second guide rail portion, facing the first guide wall portion, and spaced from the first guide wall portion by a constant distance equal to that between the first guide rail portion and the second guide wall portion, a single movable rail structure of L-shaped cross-sectional configuration pivotally supported adjacent the second guide wall portion and between the second fixed rail structure and the first end of the juncture, the movable rail structure having a horizontal portion and a vertical portion, comprising a third guide rail portion, projecting downwardly toward the roadway, the third guide rail portion having first and second ends and first and second, oppositely facing guide surfaces each substantially perpendicular to the roadway, the first guide surface of the third guide rail portion facing the first guide wall portion, the movable rail structure being pivotable, about a rotational axis substantially perpendicular to the roadway and spaced between the first and second ends of the movable rail structure, between a first position, in which the second end of the third guide rail portion is contiguous with the second guide rail portion and in which the first guide surface of the third guide rail portion is equidistant, along its length, from the first guide wall portion, and a second position in which the first end of the third guide rail portion is positioned immediately adjacent the first guide wall portion and in which the third guide rail portion second end is spaced, from the first guide wall portion, beyond the second guide rail portion and in which the distance between the second guide wall portion and the second guide surface of the third guide rail portion, along a line perpendicular to the second guide wall portion and intersecting the second end of the third guide rail portion, is substantially equal to the distance between the left and right guide walls of the guideway portions;

first guide rail following means, mounted on vehicle, for movably engaging the first guide surface of the third guide rail portion, and subsequently, the guide surface of the second guide rail portion, upon the vehicle passing through the junction from the junction first end when the movable rail structure is in its first position and, upon the movable rail structure alternatively being in its second position, for movably engaging the second guide surface of the third guide rail portion and diverting the vehicle toward the second guide wall portion; and second guide rail following means, mounted on the vehicle for movement engaging the guide surface of the first guide rail portion and guiding the vehicle alongside the second guide wall portion and onto the third portion of the guideway upon the vehicle being diverted toward the second guide wall portion.

28. The switching system of claim 27, the vehicle having means for movably engaging the guide walls for guiding the vehicle along the guideway, the means for movably engaging the guide walls including left and right follower structures adapted to ride against respective ones of the guide walls, the first and second guide rail following means being mounted on respective ones of the left and right follower structures.

29. The switching system of claim 28, wherein the first and second guide rail following means respectively comprise first and second guide rollers rotatable about respective axes substantially perpendicular to the roadway, each guide roller projecting upwardly from the respective follower structure upon which it is mounted, the first guide roller being positioned in horizontal register with the second and third guide rails, and the second guide wheel being positioned in horizontal register with the first guide rail.

30. In a transportation system employing at least one vehicle adapted to travel along a guideway, the system having a guideway junction having a first end communicating with a first portion of the guideway and a widened, bifurcated, second end communicating with second and third, mutually diverging portions of the guideway, a switching system comprising:

guiding means, comprising a single movable guide rail positioned adjacent the first end of the junction and pivotable about an approximately vertical axis between first and second positions, having a first guide surface operative for constraining a vehicle from turning toward the third guideway portion upon the vehicle entering the junction from the junction first end when the movable guide rail is in its first position, the guiding means further having a second guide surface operable for guiding a vehicle toward the third guideway portion upon the vehicle entering the junction from the junction first end when the movable guide rail is in its second position;

another guiding means comprising structure immovably positioned between the movable guide rail and the second guideway portion and operative for guiding a vehicle through the junction and onto the second guideway portion upon the vehicle being constrained by the first-mentioned means from turning toward the third guideway portion; and yet another guiding means comprising structure immovably positioned between the first end of the junction and the third guideway *portion* and operative for guiding the vehicle through the junction and onto the third guideway portion upon the vehicle being initially guided toward the third guideway portion by the first-mentioned guiding means, *the movable guide rail being spaced laterally, relative to the junction, from the structure of the third mentioned guiding means, the movable guide rail having a first end adjacent the junction first end and a second end adjacent the structure of the second-mentioned guiding means and between the structure of the second mentioned guiding means and the junction first end, the first and second guide surfaces extending along the movable guide rail to a location thereon adjacent the movable guide rail second end, the portions of the first and second guide surfaces adjacent the movable guide rail second end being intermediate the respective structures of the second and third mentioned guiding means upon the movable guide rail being in its second position.*

* * * * *